US012794606B2

(12) United States Patent

Wu et al.

(10) Patent No.: US 12,794,606 B2
(45) Date of Patent: Nov. 10, 2026

(54) WIDEBAND OPERATION WITH MULTIPLE RADIO FREQUENCY (RF) CHAINS

(71) Applicant: QUALCOMM Incorporated, San Diego, CA (US)

(72) Inventors: Shijun Wu, San Diego, CA (US); Kangqi Liu, San Diego, CA (US); Weimin Duan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 286 days.

(21) Appl. No.: 18/598,945

(22) Filed: Mar. 7, 2024

(65) Prior Publication Data

US 2025/0286670 A1 Sep. 11, 2025

(51) Int. Cl.

| | |
|---|---|
| ***H04L 5/00*** | (2006.01) |
| ***H04B 7/0413*** | (2017.01) |
| ***H04L 27/26*** | (2006.01) |

(52) U.S. Cl.

CPC ......... *H04L 5/0005* (2013.01); *H04B 7/0413* (2013.01); *H04L 5/0039* (2013.01); *H04L 27/26524* (2021.01)

(58) Field of Classification Search

CPC ................. H04L 5/0005; H04L 5/0039; H04L 27/26524; H04B 7/0413

See application file for complete search history.

(56) References Cited

U.S. PATENT DOCUMENTS

| | | | | |
|---|---|---|---|---|
| 11,252,725 B2 * | 2/2022 | Zhang | H04W 72/0453 | |
| 2008/0019422 A1 * | 1/2008 | Smith | H04B 1/713 | 375/136 |
| 2010/0195549 A1 * | 8/2010 | Aragon | H04W 52/0232 | 370/311 |
| 2014/0120975 A1 * | 5/2014 | Liu | H04W 72/53 | 455/509 |
| 2015/0257133 A1 * | 9/2015 | Kim | H04L 69/22 | 370/329 |

(Continued)

FOREIGN PATENT DOCUMENTS

WO WO-2022251985 A1 * 12/2022 ........ H04W 36/0069

OTHER PUBLICATIONS

3GPP TS 38.213: "3rd Generation Partnership Project, Technical Specification Group Radio Access Network, NR, Physical Layer Procedures for Control (Release 18)", 3GPP TS 38.213, V18.1.0, Dec. 2023, pp. 1-300.

(Continued)

*Primary Examiner* — Fahmida S Chowdhury
(74) *Attorney, Agent, or Firm* — Dinsmore & Shohl LLP

(57) ABSTRACT

Certain aspects of the present disclosure provide techniques for using multiple radio frequency (RF) chains at a time for wireless communications. A method generally includes transmitting, to a network entity, one or more reports indicating a first capability of the apparatus to use multiple RF chains at a time to communicate across contiguous frequency resources and to use each of the multiple RF chains to communicate across a respective subset of the contiguous frequency resources; and communicating, with the network entity, a signal across a contiguous frequency bandwidth, wherein each of a plurality of RF chains of the apparatus is used to communicate the signal across a respective subset of the contiguous frequency bandwidth.

30 Claims, 14 Drawing Sheets

(56) References Cited

U.S. PATENT DOCUMENTS

| | | | | |
|---|---|---|---|---|
| 2016/0223639 | A1* | 8/2016 | Davydov | H04L 5/001 |
| 2017/0346602 | A1* | 11/2017 | Zeng | H04L 1/1893 |
| 2018/0132200 | A1* | 5/2018 | Gheorghiu | H04W 88/027 |
| 2018/0235025 | A1* | 8/2018 | Chen | H04W 84/14 |
| 2019/0159140 | A1* | 5/2019 | Wang | H04W 52/325 |
| 2019/0166608 | A1* | 5/2019 | Kumar | H04W 24/08 |
| 2019/0215045 | A1* | 7/2019 | Choi | H04B 7/0626 |
| 2021/0226681 | A1* | 7/2021 | Raghavan | H04B 7/0617 |
| 2021/0377108 | A1* | 12/2021 | Cho | H04L 41/0803 |
| 2022/0039019 | A1* | 2/2022 | Xia | H04W 52/0287 |
| 2023/0379826 | A1* | 11/2023 | Paz | H04W 52/0212 |
| 2024/0049037 | A1* | 2/2024 | Lyu | H04W 28/0215 |
| 2024/0064818 | A1* | 2/2024 | Demir | H04W 52/0232 |
| 2024/0340123 | A1* | 10/2024 | Duan | H04L 5/0007 |
| 2024/0381384 | A1* | 11/2024 | Selvanesan | H04W 72/25 |
| 2025/0286670 | A1* | 9/2025 | Wu | H04W 72/51 |

OTHER PUBLICATIONS

3GPP TS 38.214: “3rd Generation Partnership Project, Technical Specification Group Radio Access Network, NR, Physical Layer Procedures for Data (Release 18)”, V18.1.0, Dec. 2023, pp. 1-290.

International Search Report and Written Opinion issued in PCT/US2025/018097, mailed Jun. 11, 2025, EPO, 13 pages.

* cited by examiner

WIDEBAND OPERATION WITH MULTIPLE RADIO FREQUENCY (RF) CHAINS

INTRODUCTION

Field of the Disclosure

Aspects of the present disclosure relate to wireless communications, and more particularly, to techniques for multiple radio frequency (RF) chains processing.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes transmitting, to a network entity, one or more reports indicating a first capability of the apparatus to use multiple radio frequency (RF) chains at a time to communicate across contiguous frequency resources and to use each of the multiple RF chains to communicate across a respective subset of the contiguous frequency resources; and communicating, with the network entity, a signal across a contiguous frequency bandwidth, wherein each of a plurality of RF chains of the apparatus is used to communicate the signal across a respective subset of the contiguous frequency bandwidth.

Another aspect provides one or more apparatuses configured for wireless communications. The one or more apparatuses include one or more memories and one or more processors, coupled to the one or more memories, configured to cause the one or more apparatuses to transmit, to a network entity, one or more reports indicating a first capability of the one or more apparatus to use multiple RF chains at a time to communicate across contiguous frequency resources and to use each of the multiple RF chains to communicate across a respective subset of the contiguous frequency resources; and communicate, with the network entity, a signal across a contiguous frequency bandwidth, wherein each of a plurality of RF chains of the one or more apparatuses is used to communicate the signal across a respective subset of the contiguous frequency bandwidth. For example, performance of any of the above steps may be by only one apparatus or by multiple apparatuses in a distributed fashion.

Another aspect provides one or more apparatuses configured for wireless communications. The one or more apparatuses include means for transmitting, to a network entity, one or more reports indicating a first capability of the one or more apparatus to use multiple RF chains at a time to communicate across contiguous frequency resources and to use each of the multiple RF chains to communicate across a respective subset of the contiguous frequency resources; and means for communicating, with the network entity, a signal across a contiguous frequency bandwidth, wherein each of a plurality of RF chains of the one or more apparatuses is used to communicate the signal across a respective subset of the contiguous frequency bandwidth. For example, performance of any of the above steps may be by only one apparatus or by multiple apparatuses in a distributed fashion.

Another aspect provides one or more non-transitory computer-readable media. The one or more non-transitory computer-readable media include executable instructions that, when executed by one or more processors of one or more apparatuses, cause the one or more apparatuses to transmit, to a network entity, one or more reports indicating a first capability of the one or more apparatus to use multiple RF chains at a time to communicate across contiguous frequency resources and to use each of the multiple RF chains to communicate across a respective subset of the contiguous frequency resources; and communicate, with the network entity, a signal across a contiguous frequency bandwidth, wherein each of a plurality of RF chains of the one or more apparatuses is used to communicate the signal across a respective subset of the contiguous frequency bandwidth. For example, the instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses.

In some examples of the methods, apparatuses, and non-transitory computer-readable media described herein, the one or more reports further indicate a maximum fast Fourier transform (FFT) size per RF chain supported by the one or more apparatuses.

In some examples of the methods, apparatuses, and non-transitory computer-readable media described herein, the one or more reports further indicate a maximum bandwidth per RF chain supported by the one or more apparatuses.

In some examples of the methods, apparatuses, and non-transitory computer-readable media described herein, the one or more reports further indicate a maximum number of subsets of contiguous frequency resources supported by the one or more apparatuses.

In some examples of the methods, apparatuses, and non-transitory computer-readable media described herein, the one or more reports further indicate a maximum number of multi-input-multiple-output (MIMO) layers supported by the one or more apparatuses when operating according to the first capability of using multiple RF chains to communicate across contiguous frequency resources.

In some examples of the methods, apparatuses, and non-transitory computer-readable media described herein, a maximum number of MIMO layers supported by the one or more apparatuses when operating according to the first capability of using multiple RF chains to communicate across contiguous frequency resources is based on at least one of: a maximum bandwidth; a subcarrier spacing (SCS) configured for communication between the network entity and the one or more apparatuses; a number of RF chains of the one or more apparatuses configured for communication between the network entity and the one or more apparatuses; a maximum FFT size per RF chain supported by the one or more apparatuses; a maximum bandwidth per RF chain supported by the one or more apparatuses; or a maximum number of subsets of contiguous frequency resources supported by the one or more apparatuses.

In some examples of the methods, apparatuses, and non-transitory computer-readable media described herein, the maximum bandwidth comprises a bandwidth configured for communication between the network entity and the one or more apparatuses.

In some examples of the methods, apparatuses, and non-transitory computer-readable media described herein, the maximum bandwidth comprises a nominal maximum system bandwidth of the network entity.

Some examples of the methods, apparatuses, and non-transitory computer-readable media described herein may further include operations, features, means, or instructions for receiving a configuration of one or more reference signal occasions configured for communicating one or more reference signals spanning the contiguous frequency bandwidth.

In some examples of the methods, apparatuses, and non-transitory computer-readable media described herein, each of the one or more reference signal occasions spans the contiguous frequency bandwidth.

In some examples of the methods, apparatuses, and non-transitory computer-readable media described herein, each of the one or more reference signal occasions spans a respective subset of the contiguous frequency bandwidth.

In some examples of the methods, apparatuses, and non-transitory computer-readable media described herein, the one or more reports further indicate a second capability of the one or more apparatuses to tune each RF chain of the plurality of RF chains to multiple subsets of the contiguous frequency bandwidth.

In some examples of the methods, apparatuses, and non-transitory computer-readable media described herein, the signal carries control information.

In some examples of the methods, apparatuses, and non-transitory computer-readable media described herein, communicating the signal comprises receiving the signal; or transmitting the signal.

Another aspect provides a method for wireless communications by an apparatus. The method includes receiving, from a user equipment (UE), one or more reports indicating a first capability of the UE to use multiple RF chains at a time to communicate across contiguous frequency resources and to use each of the multiple RF chains to communicate across a respective subset of the contiguous frequency resources consisting of less than all of the contiguous frequency resources; and communicating, with the UE, based on the first capability, a signal across a contiguous frequency bandwidth.

Another aspect provides one or more apparatuses configured for wireless communications. The one or more apparatuses include one or more memories and one or more processors, coupled to the one or more memories, configured to cause the one or more apparatuses to receive, from a UE, one or more reports indicating a first capability of the UE to use multiple RF chains at a time to communicate across contiguous frequency resources and to use each of the multiple RF chains to communicate across a respective subset of the contiguous frequency resources consisting of less than all of the contiguous frequency resources; and communicate, with the UE, based on the first capability, a signal across a contiguous frequency bandwidth. For example, performance of any of the above steps may be by only one apparatus or by multiple apparatuses in a distributed fashion.

Another aspect provides one or more apparatuses configured for wireless communications. The one or more apparatuses include means for receiving, from a UE, one or more reports indicating a first capability of the UE to use multiple RF chains at a time to communicate across contiguous frequency resources and to use each of the multiple RF chains to communicate across a respective subset of the contiguous frequency resources consisting of less than all of the contiguous frequency resources; and means for communicating, with the UE, based on the first capability, a signal across a contiguous frequency bandwidth. For example, performance of any of the above steps may be by only one apparatus or by multiple apparatuses in a distributed fashion.

Another aspect provides one or more non-transitory computer-readable media. The one or more non-transitory computer-readable media include executable instructions that, when executed by one or more processors of one or more apparatuses, cause the one or more apparatuses to receive, from a UE, one or more reports indicating a first capability of the UE to use multiple RF chains at a time to communicate across contiguous frequency resources and to use each of the multiple RF chains to communicate across a respective subset of the contiguous frequency resources consisting of less than all of the contiguous frequency resources; and communicate, with the UE, based on the first capability, a signal across a contiguous frequency bandwidth. For example, the instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses.

In some examples of the methods, apparatuses, and non-transitory computer-readable media described herein, the one or more reports further indicate a maximum FFT size per RF chain supported by the UE.

In some examples of the methods, apparatuses, and non-transitory computer-readable media described herein, the one or more reports further indicate a maximum bandwidth per RF chain supported by the UE.

In some examples of the methods, apparatuses, and non-transitory computer-readable media described herein, the one or more reports further indicate a maximum number of subsets of contiguous frequency resources supported by the UE.

In some examples of the methods, apparatuses, and non-transitory computer-readable media described herein, the one or more reports further indicate a maximum number of MIMO layers supported by the UE when operating according to the first capability of using multiple RF chains to communicate across contiguous frequency resources.

Some examples of the methods, apparatuses, and non-transitory computer-readable media described herein may further include operations, features, means, or instructions for determining a maximum number of MIMO layers supported by the UE when the UE is operating according to the first capability of using multiple RF chains to communicate across contiguous frequency resources is based on at least one of: a maximum bandwidth; a SCS configured for communication between the one or more apparatuses and the UE; a number of RF chains of the UE configured for communication between the one or more apparatuses and the UE; a maximum FFT size per RF chain supported by the UE; a maximum bandwidth per RF chain supported by the UE; or a maximum number of subsets of contiguous frequency resources supported by the UE.

In some examples of the methods, apparatuses, and non-transitory computer-readable media described herein, the maximum bandwidth comprises a bandwidth configured for communication between the UE and the one or more apparatuses.

In some examples of the methods, apparatuses, and non-transitory computer-readable media described herein, the maximum bandwidth comprises a nominal maximum system bandwidth of the one or more apparatuses.

Some examples of the methods, apparatuses, and non-transitory computer-readable media described herein may further include operations, features, means, or instructions for transmitting a configuration of one or more reference signal occasions configured for communicating one or more reference signals spanning the contiguous frequency bandwidth.

In some examples of the methods, apparatuses, and non-transitory computer-readable media described herein, each of the one or more reference signal occasions spans the contiguous frequency bandwidth.

In some examples of the methods, apparatuses, and non-transitory computer-readable media described herein, each of the one or more reference signal occasions spans a respective subset of the contiguous frequency bandwidth.

In some examples of the methods, apparatuses, and non-transitory computer-readable media described herein, the one or more reports further indicate a second capability of the UE to tune each RF chain of a plurality of RF chains of the UE to multiple subsets of the contiguous frequency bandwidth.

In some examples of the methods, apparatuses, and non-transitory computer-readable media described herein, the signal carries control information.

In some examples of the methods, apparatuses, and non-transitory computer-readable media described herein, communicating the signal comprises: transmitting the signal; or receiving the signal.

An apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
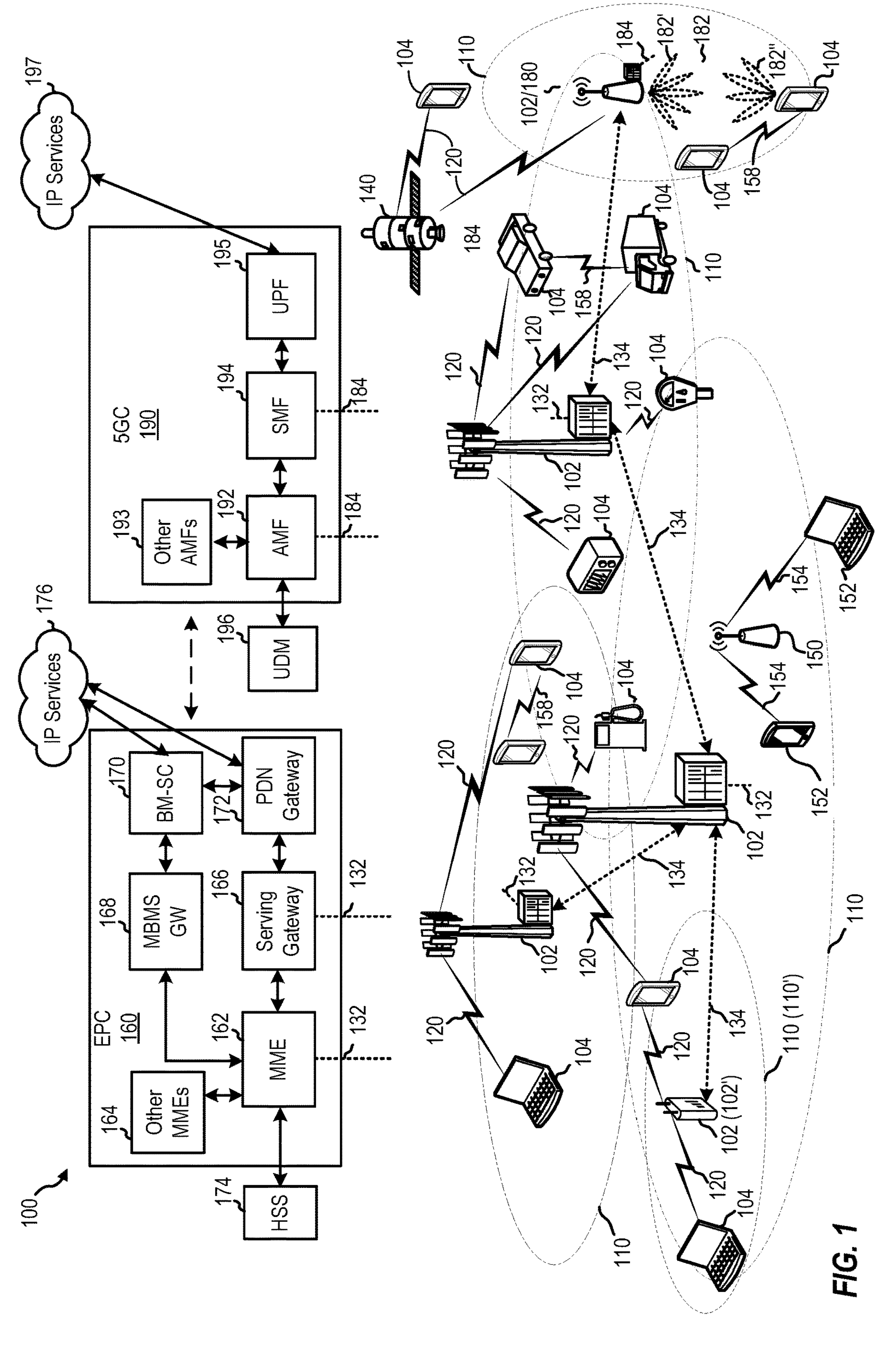
FIG. 1 depicts an example wireless communications network.

Aspects of the present disclosure provide apparatuses, methods, processing systems, and computer-readable mediums for reporting a multiple radio frequency (RF) chains processing capability of a UE to process, for example, wideband signals. As used herein, a wideband signal may be a signal communicated, via a carrier, over a relatively large bandwidth.

Every new generation of wireless technology brings new capabilities, such as increased carrier bandwidth to increase the total bandwidth available for data transmission. For example, the move from 3G to 4G grew carrier bandwidth size from 5 megahertz (MHz) to 20 MHz, while the transition from 4G to 5G saw carrier bandwidth grow from 20 MHz to 100 MHz. This increase in spectral bandwidth is similarly expected to continue for 6G, as well as other later-released generations of wireless technologies. For example, 6G is expected to expand the carrier bandwidth from 100 MHz (e.g., currently for 5G wireless technologies) to approximately 400 MHz to provide up to a four time increase in capacity. This level of capacity, which may be achieved in 6G, may help to extend the performance of 5G applications, and/or may help to expand the scope of capabilities needed to support new and innovative applications in wireless connectivity, cognition, sensing, and imaging. Further, the increased capacity in 6G may help to achieve peak data rates for data transfers.

While an increase in carrier bandwidth may provide the aforementioned advantages, in some cases, the increased carrier bandwidth may be greater than a single-carrier bandwidth capability of a UE. For example, in orthogonal frequency division multiplexing (OFDM) systems, Fast Fourier Transform (FFT), which is used to convert time domain signals to the frequency domain, and/or inverse FFT (iFFT), which is used to convert frequency domain signals to the time domain, may be implemented in a radio frequency (RF) chain of a UE, such as a receiver (RX) chain or transmitter (TX) chain of the UE, to receive or transmit an OFDM signal. In certain cases, the RF chain of the UE may be limited in a number of FFT or iFFT operations it can perform on a given communication, such as based on a design of the RF chain. For example, the RF chain may have processing constraints limiting how many FFT operations or iFFT operations it can perform within a time interval. The maximum number of FFT operations or iFFT operations that the RF chain can perform for a communication may be referred to as a maximum FFT size of the RF chain. For example, while a signal communicated in a time interval and across a carrier bandwidth of 100 MHz may require 4,096 FFT operations to be performed, a signal communicated in a time interval and across a carrier bandwidth of 400 MHz may require 16,384 FFT operations to be performed. Some UEs may not have RF chains with a maximum FFT size that is able to process such a signal communicated across a larger carrier bandwidth. As such, this FFT size limitation of some RF chains presents a technical problem for wireless technologies that support larger single carrier bandwidths.

In certain aspects, an RF chain that is a TX chain may convert digital baseband signals into analog RF signals. The RF chain that is a TX chain may include a baseband filter (BBF), a mixer (which may include one or several mixers), and a digital to analog converter (DAC). In certain aspects, an RF chain that is an RX chain may convert analog RF or intermediate frequency (IF) signals into baseband signals. The RF chain that is an RX chain may include a mixer (which may include one or several mixers), an analog to digital converter (ADC), and a BBF. A device with MIMO capability may have multiple RF chains for simultaneously processing multiple data streams and/or signals.

In certain aspects, to overcome this technical problem associated with increased carrier bandwidth, multiple RF chain processing at a UE may be enabled. For example, a UE may include multiple RF chains. Each RF chain may be coupled to one or more antenna elements or antenna arrays. RF chains may share antenna elements or arrays, or may be coupled to different antenna elements or arrays. Each RF chain may be configured to process signals received at the UE (e.g., from a network entity, another UE, etc.) and/or transmitted by the UE (e.g., to a network entity, another UE, etc.). In certain aspects, multiple RF chains at a UE may be used to process larger bandwidth signals (e.g., signals communicated over a contiguous bandwidth that are greater than a carrier bandwidth capability of a single RF chain of the UE based on the FFT size supported by the RF chain). In particular, each of multiple RF chains at the UE may be used to process a portion of a signal bandwidth (e.g., partial bandwidth/subband processing) to enable wideband operation. For example, each RF chain of the UE may support an FFT size capable of processing a 100 MHz bandwidth signal. To communicate across a larger contiguous frequency bandwidth, such as 400 MHz, the UE may be configured to use multiple RF chains, e.g., four RF chains, to communicate across the larger contiguous frequency bandwidth, where each RF chain is used communicate across a respective partial bandwidth of the larger contiguous frequency bandwidth. For example, the larger contiguous frequency bandwidth may be divided into a plurality of subsets of the contiguous frequency bandwidth, and each RF chain may be used to communicate across a respective subset of the contiguous frequency bandwidth. Accordingly, multiple RF chains processing at a UE may allow for the use of larger bandwidth carriers to increase capacity of the wireless communications system, without increasing a maximum FFT size per RF chain supported at a UE and/or without increasing signaling overhead (e.g., a disadvantage of using carrier aggregation, as described herein, such as based on carrier aggregation requiring guard bands between carriers, such that the carriers are not contiguous in frequency).

In certain aspects, increased capacity achieved via multiple RF chains processing at a UE may be at the expense of a multiple-input-multiple-output (MIMO) operation implemented between the UE and a wireless communications device (e.g., a network entity or another UE). MIMO is a wireless technology that uses multiple antennas at both a transmitter and a receiver to transmit and receive multiple independent data streams, also referred to as "layers," simultaneously to improve communication performance by exploiting spatial diversity and multipath propagation. Specifically, MIMO layers refer to the parallel spatial channels in a MIMO system, which play a crucial role in spatial multiplexing, leading to increased data rates and improved system performance. In certain aspects, a UE's MIMO capability, or a number of MIMO layers that may be used for MIMO communication (e.g., uplink and/or downlink communication) at the UE, may be reduced based on a number of RF chains being used to process signal(s) across a given carrier bandwidth at the UE. For example, each MIMO layer may require separate one or more RF chains to process the MIMO layer, where the one or more RF chains required to process a given MIMO layer is based on the carrier bandwidth ($C_B$) used for communication, and a maximum bandwidth ($B_{MAX}$) the UE can process per RF chain. For example, to process L MIMO layers, the UE may require R RF chains, where $R=L*C_B/B_{MAX}$. Accordingly, if R and $B_{MAX}$ remain constant, as $C_B$ increases, L decreases.

Due to the impact of multiple RF chains processing on MIMO operations, and more specifically on a number of MIMO layers that may be used for communication, wireless communications devices, such as a network entity, may need to be informed about a UE's capability to use multiple RF chains at a time when communicating with the UE. Thus, aspects described herein provide techniques for reporting a UE's multiple RF chains processing capability to wireless communications devices, such as a network entity. For example, a UE may send, to a network entity, report(s) indicating a capability of the UE to use multiple RF chains at a time to communicate across contiguous frequency resources, and more specifically, a capability of the UE to use each of the multiple RF chains to communicate across a subset of the contiguous frequency resources (e.g., a subband of a bandwidth used for communication). The indication may be a simple binary number indicating whether or not the UE is capable of using multiple RF chains at a time to communicate across contiguous frequency resources, or some other indication. The network entity receiving the report(s), comprising such capability information, may use this information when communicating with the UE. For example, the network entity may use this information when determining a number of MIMO layers to use for downlink or uplink communications with the UE.

In certain aspects, in addition to reporting a multiple RF chains processing capability of the UE, the UE may report additional capability information to a wireless communications device, such as a network entity to aid the network entity in determining a number of MIMO layers to use for communications with the UE. This capability information may include information about a maximum FFT size per RF chain supported by the UE, information about a maximum number of subsets of contiguous frequency resources (e.g., subbands) supported by UE, and/or the like. Alternatively, the capability information may include an explicit indication of a maximum number of MIMO layers supported at the UE when using multiple RF chains to communicate across contiguous frequency resources.

In certain aspects, different RF antenna elements (or arrays), associated with RF chains at the UE, may not be co-located at the UE. Thus, some RF chains may be better suited for different frequency subbands than other RF chains at the UE. To determine which subband(s) to tune each RF chain at the UE to, one or more reference signals (RSs) may be measured by one or more RF chains at the UE for a contiguous frequency bandwidth and/or for one or subbands of the contiguous frequency bandwidth. To enable such measurement, different configurations of RS occasion(s) configured for communicating RS(s) spanning the contiguous frequency bandwidth, may be configured at the UE.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 and/or aerial or spaceborne platform(s), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms “cell” or “serving cell” may refer to or correspond to a specific carrier frequency (e.g., a component carrier) used for wireless communications, and a “cell group” may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
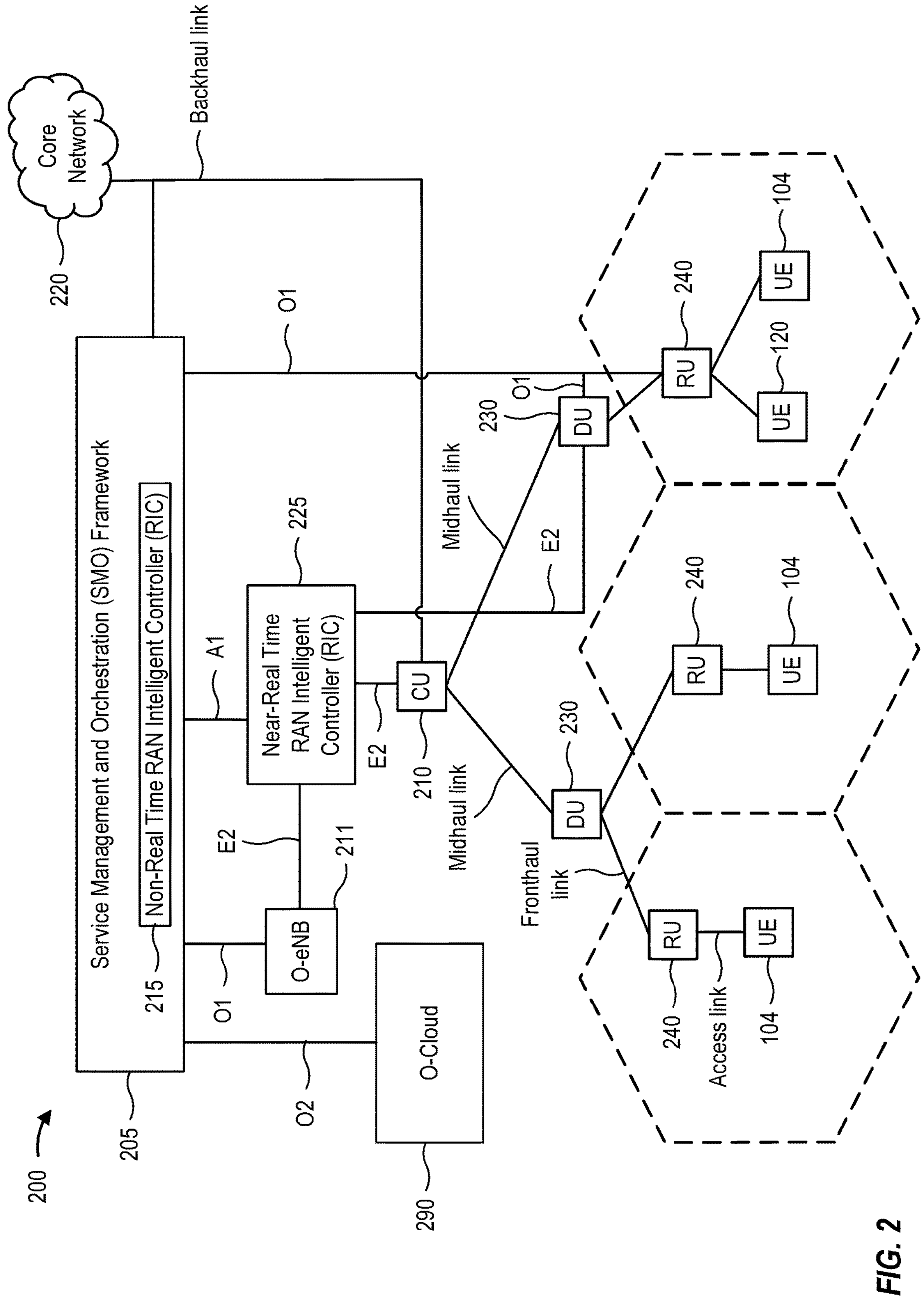
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
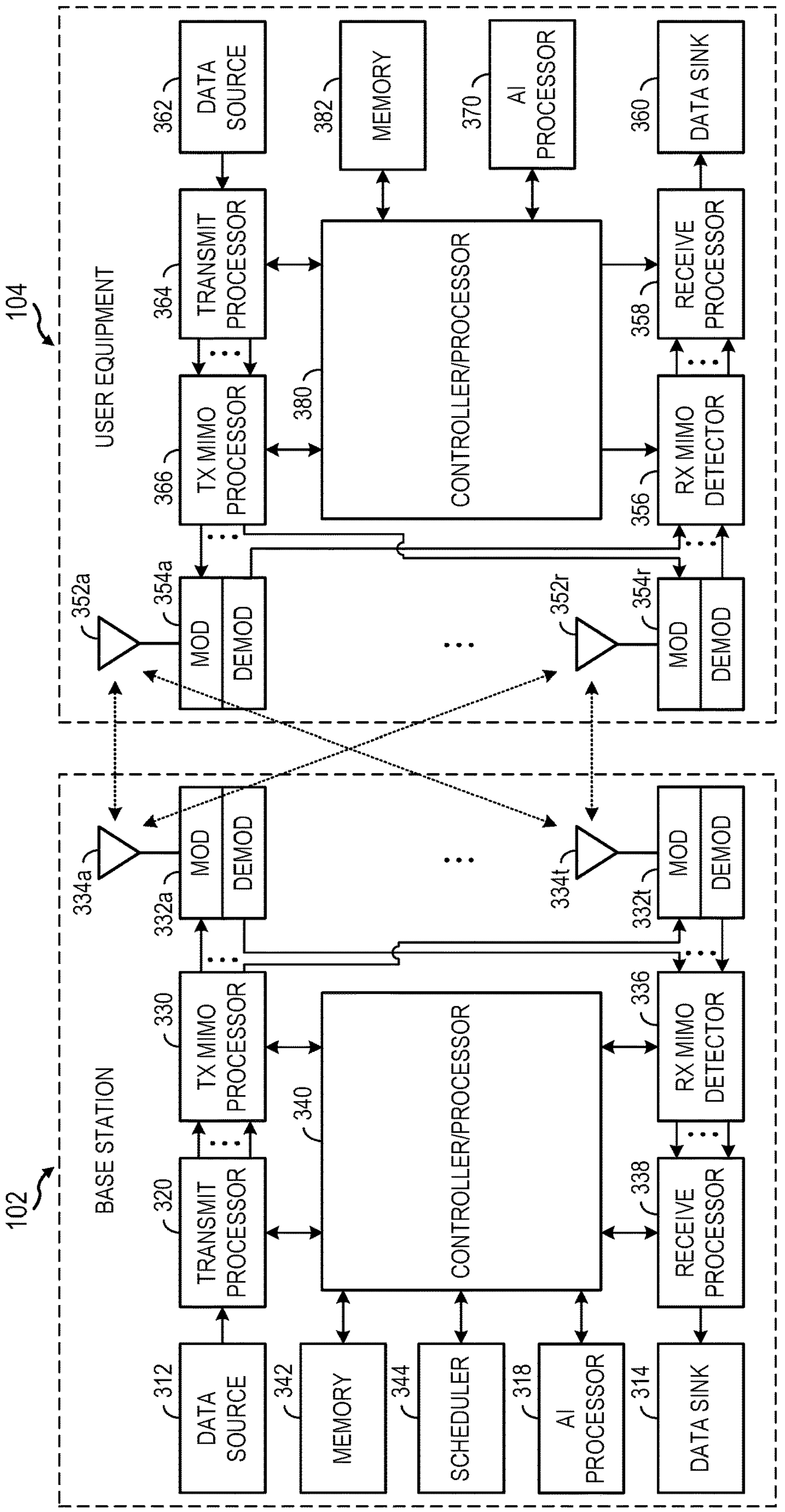
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications. Note that the BS 102 may have a disaggregated architecture as described herein with respect to FIG. 2.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning prediction). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
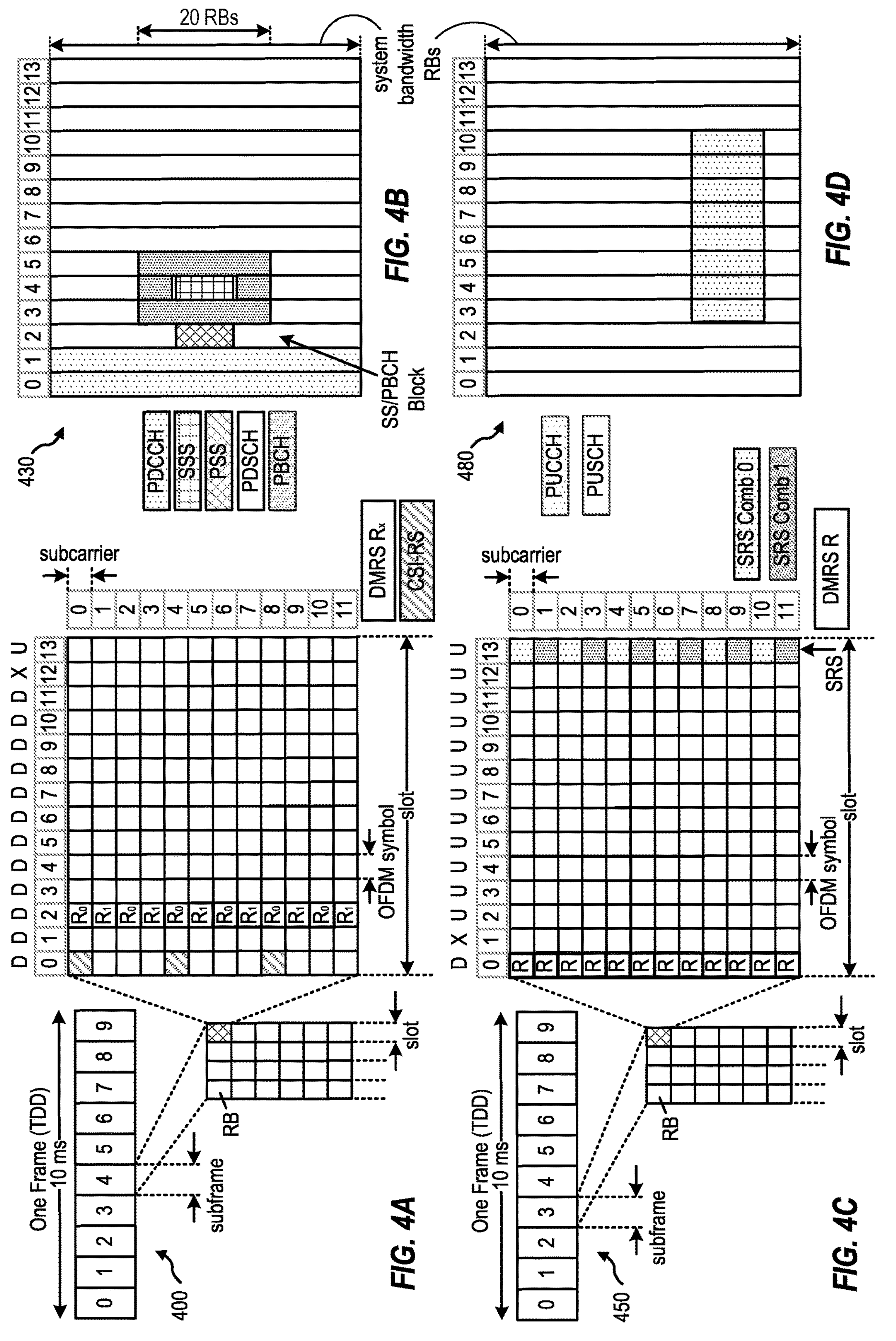
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology $\mu$, there are $2^{\mu}$ slots per subframe. Thus, numerologies ($\mu$) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times15$ kHz, where u is the numerology 0 to 6. As an example, the numerology $\mu=0$ corresponds to a subcarrier spacing of 15 kHz, and the numerology $\mu=6$ corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu=2$ with 4 slots per subframe. In such a case, the slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Carrier Bandwidth

As described herein, network entities (e.g., such as BS 102 depicted and described with respect to FIGS. 1 and 3 or a disaggregated base station depicted and described with respect to FIG. 2) wirelessly communicate with (e.g., transmit signals to or receive signals from) UEs (e.g., such as UE 104 depicted and described with respect to FIGS. 1 and 3) via communications links (e.g., such as communication links 120 depicted and described with respect to FIG. 1). The communications may occur using one or more carriers. For example, a network entity may use one or more carriers associated with a cell of the network entity for communications with UE(s) in the cell. Similarly, a UE may use one or more carriers associated with the cell for communications with the network entity in the cell.

Carriers used for such communication may have different bandwidths. Bandwidth, in spectrum, refers to a range of frequencies used to convey signals that transmit data over the radio frequency. The more bandwidth assigned to a carrier, the more data it can send and receive at one time. A bandwidth of an individual carrier may be equal to 5, 10, 15, 20, 100, and/or other MHz, up to a maximum carrier bandwidth defined for various wireless technologies.

For example, different maximum carrier bandwidths are defined for 2G, 3G, 4G, and 5G wireless technologies. For 2G, a maximum bandwidth of an individual 2G carrier is 200 kHz (e.g., per Global System for Mobile Communications (GSM)) or 1.25 MHz (e.g., per Interim Standards 95 (IS-95)). For 3G, a maximum bandwidth of an individual 3G carrier is 5 MHz, or four times the carrier size of a 2G carrier. For 4G and 5G, a maximum bandwidth of an individual carrier is 20 MHz (e.g., four times greater than the carrier size of a 3G carrier) and 100 MHz (e.g., five times greater than the carrier size of a 4G carrier), respectively. Thus, in essence, every new generation of wireless technology has increased carrier bandwidth from the previous generation. The increase in bandwidth increases the volume of data that can be communicated between entities at a time, thereby increasing the overall capacity of a wireless communications network. For example, a higher bandwidth implies that a larger amount of data can be transmitted, thus increasing the capacity of a cell.

This increase in spectral bandwidth is expected to continue for 6G, as well as other later-released generations of wireless technologies. Specifically, 6G is expected to expand the carrier bandwidth from 100 MHz (e.g., currently for 5G wireless technologies) to approximately 400 MHz (or 500 MHz) to provide up to a four times increase (or five times increase) in capacity. Further, in 6G, improvements in antennas, through the application of more sophisticated MIMO techniques may also help to make a significant increase in capacity for 6G wireless technologies by sending more streams of data simultaneously. This level of capacity offered in 6G may help to extend the performance of 5G applications, as well as expand the scope of capabilities to support new and innovative applications in wireless connectivity, cognition, sensing, and imaging. Further, the increased capacity in 6G may help to achieve peak data rates for data transfers.

Increasing carrier bandwidth in 6G and later generations of wireless technologies may increase the number of tones in a single carrier. For example, in 5G, the maximum carrier bandwidth is 100 MHz and is defined as 273 PRBs for a subcarrier spacing (SCS) of 30 kHz. As described above, each PRB may extend 12 consecutive subcarriers; thus, the 100 MHz bandwidth may include 3,276 subcarriers (e.g., 273 PRBs×12 subcarriers per PRB=3,276 subcarriers), which may also be referred to as tones. Thus, a single 100 MHz carrier may include 3,276 tones.

In 6G, this number of tones per carrier may be increased by a factor of four. Specifically, as described herein, a maximum carrier bandwidth considered for 6G wireless technologies is 400 MHz. Thus, because a single 100 MHz carrier may include 3,276 tones, a single 400 MHz carrier, supported in 6G, may include a total of 13,104 tones (e.g., 3,276 tones×4 scaling factor=13,104 tones).

In OFDM systems, an OFDM signal is generated by implementing, at a transmitter RF chain of a device (such as a UE or network entity), Inverse Fast Fourier Transform (IFFT), which is used to convert frequency domain to time domain. An OFDM signal may be decoded, at a receiver RF chain of a device, by implementing Fast Fourier Transform (FFT), which is used to convert time domain to frequency domain. As discussed, an FFT size of an RF chain of the UE may be limited, thereby limiting a maximum number of subcarriers, or tones, which may be processed by the RF chain. For example, 5G NR supports a maximum FFT size of 4K (4,096 FFT size). As such, a maximum number of subcarriers, or tones, which may be processed by a receiver of a signal, may be equal to 4,096 subcarriers. This FFT size limitation presents a technical problem for processing a larger number of subcarriers, such as for 6G wireless technologies, which may support a single 400 MHz carrier, including 13,104 tones. For example, in conventional transmitter and receiver architecture, an FFT size greater than 13K, such as 16K FFT, may be needed to process the 13,104 tones included in the 400 MHz carrier. Unfortunately, an FFT size greater than 4K may not be supported by some RF chains of some UEs.

One solution to this technical problem is to implement carrier aggregation. Carrier aggregation is a bandwidth-extension technology supported since LTE-Advanced, which can aggregate multiple carriers for simultaneous reception or transmission. Carrier aggregation may involve using multiple carriers simultaneously to create a wider channel for data transmission, which may help to increase data throughput and/or reduce latency, thereby allowing for a more efficient and responsive mobile network. For example, if a network entity supports the use of a 100 MHz carrier while a UE only supports up to a 25 MHz carrier (e.g., a "wide carrier" operation where carrier bandwidth is greater than single-carrier bandwidth capability for the UE), the UE may use intra-band carrier aggregation to implement a wideband operation of 100 MHz. Intra-band carrier aggregation involves aggregating carriers in a same frequency band, separated by a guard band (e.g., a frequency band used to prevent interference), for communication across a larger bandwidth. Increased capacity and higher data rates offered by carrier aggregation, however, comes at the expense of increased signaling overhead. For example, guard band overhead due to the placement of guard bands between each pair of carriers, more control signaling overhead, and/or the like associated with intra-band carrier aggregation, may contribute to the increased signaling overhead. In particular, in carrier aggregation, signals cannot be communicated in the guard bands, in order for the signals in the separate carriers to be decodable, and therefore, the communication is not over the entire contiguous bandwidth, but rather on separated bandwidths. For example, with carrier aggregation, to communicate over 100 MHz, the 100 MHz may be divided into separate carriers that are separated by guard bands. For example, there may be three guard bands of 4 MHz separating four carriers of 22 MHz, over the 100 MHz bandwidth, such that only 88 MHz is used for communication, instead of the entire contiguous 100 MHz.

Further, use of carrier aggregation for communication of a wideband signal contradicts the increase in carrier bandwidth, which may be supported by some wireless technologies. Thus, carrier aggregation operation for applications requiring wideband (e.g., larger) bandwidth operation, such as sensing, may not be desirable.

Aspects Related to Wideband Operation Using Multiple RF Chains

In certain aspects, to overcome the aforementioned technical problems associated with increased carrier bandwidth, which may be supported in 6G and later wireless generation technologies, multiple RF chain processing at a UE may be enabled. As described herein, an RF chain is a series of interconnected components, designed to process, receive, and/or transmit signals. Each RF chain may be configured to perform low-pass filtering (LPF), digital to analog conversion (DAC) or analog to digital conversion (ADC), and FFT or IFFT, to process signals.

In some cases, multiple RF chains at a UE may be used by the UE to process larger bandwidth signals (e.g., signals communicated over a bandwidth that is greater than a single RF chain of the UE can process). In particular, each RF chain at the UE may be used to process a portion of a signal bandwidth (e.g., partial bandwidth processing) to enable wideband operation in the uplink and/or the downlink. For example, a single RF chain of the UE may support processing of a 100 MHz carrier, such as for uplink or downlink communications with a network entity. Thus, for the UE to communicate across a contiguous frequency 400 MHz bandwidth using a 400 MHz carrier, the UE may use multiple RF chains. Specifically, four RF chains may be used, where each RF chain processes a portion of the signal bandwidth (e.g., a subband or a subset of the contiguous frequency bandwidth), for example 100 MHz of the 400 MHz bandwidth signal, to enable wideband operation.

Multiple RF chains processing at the UE may be enabled for uplink and/or downlink communications. In certain aspects, multiple RF chains processing is enabled at the UE for downlink communications, but not uplink communications, due to more demanding bandwidth in the downlink.

Further, in certain aspects, multiple RF chains processing at the UE may be enabled for only control information transmissions (e.g., non-data transfer signals), such as used for positioning, sensing, and/or the like. For example, in certain aspects, for data communication via the PDSCH and/or PUSCH, wideband operation at the UE may not be supported. Alternatively, in certain aspects, multiple RF chains processing at the UE may be enabled for all communication types, including both control signaling and data transmissions. For example, multiple RF chains processing at the UE may be used for data transfer-related signals/channels, which may help to improve communication peak performance (e.g., for downlink).

Figure 5A:
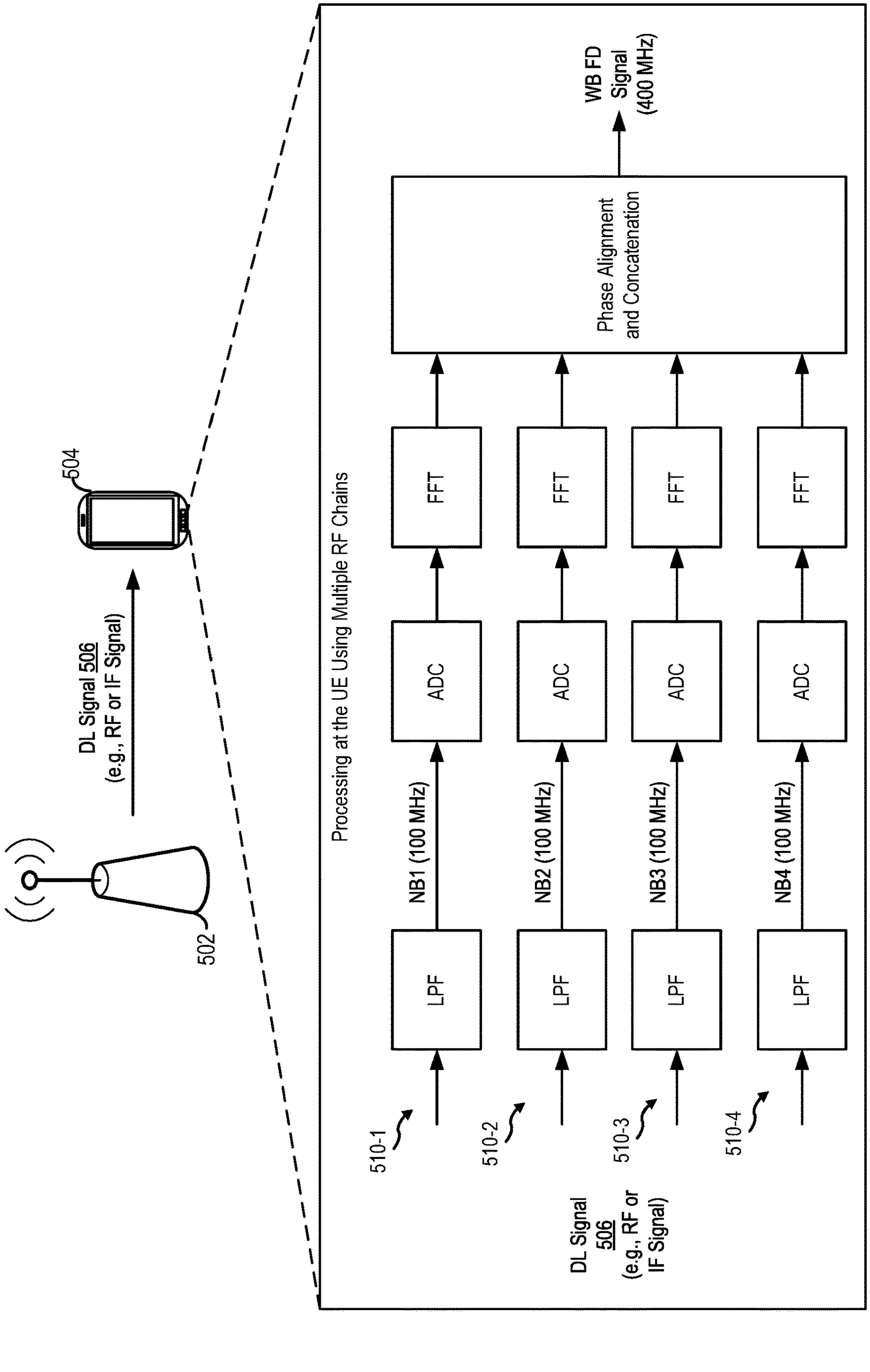
FIGS. 5A and 5B depict example processing at a UE using multiple radio frequency (RF) chains for communication.
Figure 5B:
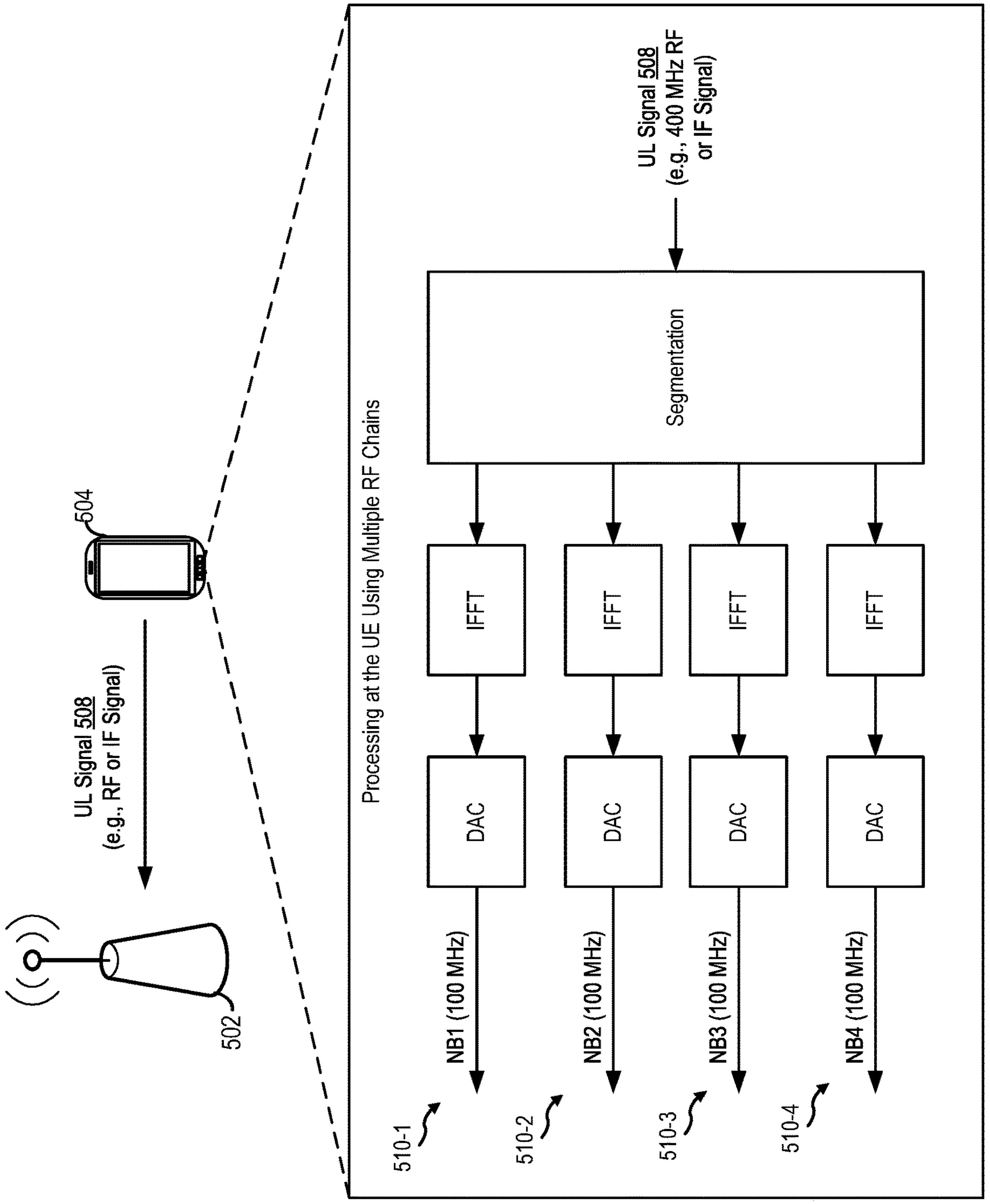

FIGS. 5A and 5B depict example processing 500*a*, 500*b* at a UE using multiple RF chains for communication. More specifically, example processing 500*a* depicted in FIG. 5A utilizes multiple RF chains at the UE to receive a wideband signal from a network entity. Example processing 500*b* depicted in FIG. 5B utilizes multiple RF chains at the UE to transmit a wideband signal to a network entity.

As shown in FIG. 5A, a network entity 502 (e.g., an example of the BS 102 depicted and described with respect to FIGS. 1 and 3 or a disaggregated base station depicted and described with respect to FIG. 2) sends, to a UE 504 (e.g., an example of the UE 104 depicted and described with respect to FIGS. 1 and 3), a downlink signal 506 across a contiguous frequency bandwidth. Downlink signal 506 may be an RF signal or an intermediate frequency (IF) signal. For this example, network entity 502 may send downlink signal 506 to UE 504 across a 400 MHz bandwidth of contiguous frequency resources. However, in other examples, the downlink signal 506 may be sent across a different bandwidth.

UE 504 may support a maximum carrier bandwidth, such as of 100 MHz in an example, per RF chain 510; thus, in this example, UE 504 may simultaneously use four RF chains 510-1, 510-2, 510-3, and 510-4 (collectively referred to herein as "RF chains 510" and individually referred to herein as "RF chain 510") at UE 504 to receive and process the 400 MHz signal 506 from network entity 502 (e.g., 400 MHz bandwidth signal/100 MHz=4 RF chains). Specifically, each RF chain 510 may be used to process a subset of contiguous frequency resources, e.g., a 100 MHz subband, of the 400 MHz bandwidth signal 506. The subbands may be non-overlapping in frequency and cover the entire bandwidth of signal 506. Each RF chain 510 processes 100 MHz of the 400 MHz bandwidth signal 506 by (1) applying a 100 MHz LPF towards the 100 MHz bandwidth processed by the respective RF chain 510, (2) performing ADC, and/or (3) performing FFT. LPF may be used to pass signals below a cutoff frequency while attenuating all signals above. As such, in this case, LPF performed at a single RF chain 510 may be used to obtain a narrow band (NB) signal of 100 MHz from the transmitted 400 MHz bandwidth signal 506 (e.g., shown as NB1 for RF chain 510-1, NB2 for RF chain 510-2, NB3 for RF chain 510-3, and NB4 for RF chain 510-4). Although FIG. 5A illustrates the use of LPF, in some other examples, band pass filtering (BPF) may alternatively be applied. ADC converts the 100 MHz narrow band signal to a digital signal and FFT converts the time domain signal to the frequency domain. In an example, a maximum FFT size of 4K may be used to process the signal at each RF chain 510. After each 100 MHz of the 400 MHz bandwidth signal 506 is processed by the RF chains 510, phase alignment may be applied. Phase alignment may be optional, for example, phase alignment may be based on a capacity of UE 504 to perform phase alignment and/or based on a requirement for maintaining coherent phase in the wideband signal 506 (e.g., phase alignment may be necessary for certain applications, such as sensing applications). Further, concatenation may be applied to concatenate each 100 MHz signal processed by each RF chain 510 to create a wideband frequency domain (FD) signal (e.g., the 400 MHz signal 506).

Some processing shown in FIG. 5A for receiving a signal from network entity 502 may also be used to transmit a signal to network entity 502 over a contiguous frequency bandwidth. For example, in FIG. 5B, to transmit a 400 MHz, uplink signal 508 to network entity 502, UE 504 may use four RF chains 510-1, 510-2, 510-3, and 510-4, similar to FIG. 5A, to process the signal 508 prior to transmission. The 400 MHz, uplink signal 508 may be segmented into four 100 MHz NB signals (e.g., (e.g., shown as NB1 for RF chain 510-1, NB2 for RF chain 510-2, NB3 for RF chain 510-3, and NB4 for RF chain 510-4), and each RF chain 510 may process one of the four 100 MHz signals by (1) performing IFFT (e.g., using a 4K FFT size) and (2) performing DAC to convert the 100 MHz signal to an analog signal.

Thus, as shown in FIGS. 5A and 5B, using multiple RF chains at UE 504 may enable UE 504 to process a wideband signal 506, 508 without increasing the FFT size (e.g., increasing to an FFT size greater than 13K). Further, using multiple RF chains at UE 504 may enable UE 504 to process the wideband signal 506, 508 without increasing overhead due to the use of guard bands or additional control signaling, which may occur when carrier aggregation is implemented, as described herein. Accordingly, multiple RF chains processing at a UE may allow for the use of larger bandwidth carriers to increase capacity of the wireless communications system.

While the use of multiple RF chains to communicate across contiguous frequency resources provides the aforementioned advantages, multiple RF chains processing at a UE may impact the UE's MIMO operation, when a MIMO operation is implemented for communicating with a network entity. In particular, a number of MIMO layers that may be used for MIMO communication (e.g., uplink and/or downlink communication) may be based on a number of RF chains available for communication at a transmitter and/or a receiver. For example, a UE capable of using four RF chains simultaneously for receiving and processing downlink communications from a network entity may be capable of receiving up to four MIMO layer transmissions in the downlink, from the network entity. However, when RF chain(s) at the UE are used to process a wideband signal, by each RF chain processing a subset of contiguous frequency resources of the wideband signal (e.g., each RF chain processing 100 MHz of a 400 MHz downlink signal), MIMO capability may decrease. In particular, a number of MIMO layers used for downlink communications with the UE may decrease. For example, each MIMO layer may require separate one or more RF chains to process the MIMO layer, where the one or more RF chains required to process a given MIMO layer is based on the carrier bandwidth ($C_B$) used for communication, and a maximum bandwidth ($B_{MAX}$) the UE can process per RF chain. For example, to process L MIMO layers, the UE may require R RF chains, where $R=L*C_B/B_{MAX}$. Accordingly, if R and $B_{MAX}$ remain constant, as $C_B$ increases, L decreases.

In a first illustrative example, a UE may include four RF chains (e.g., based on UE implementation), each capable of processing a maximum bandwidth equal to 100 MHz. Thus, when the UE receives a 400 MHz wideband signal, the UE may need to split the 400 MHz wideband signal into four narrowband 100 MHz signals to process the wideband signal (e.g., based on a capability of each RF chain at the UE to process a maximum bandwidth of 100 MHz). While a network entity may transmit up to four layers to the UE in a MIMO operation, in this case where all four RF chains of the UE are being used to process different subbands of the 400 MHz wideband signal, the network entity may use only one MIMO layer for downlink transmission when communicating with the UE.

In a second illustrative example, the same UE (e.g., capable of processing 100 MHz per RF chain and including four RF chains) may receive a 200 MHz signal instead of a 400 MHz signal. Based on an ability of each RF chain to process 100 MHz, the UE may need to split the 200 MHz signal into two narrowband 100 MHz signals for processing (e.g., 200 MHz signal/100 MHz processing capability per RF chain=2 narrowband signals). Each of the two narrowband signals may be processed by two of the RF chains at the UE (e.g., two RF chains process the first narrowband signal and two RF chains process the second RF signal). In this case, the network entity may use two MIMO layers for downlink transmission when communicating with the UE, but not more than two.

Due to the impact of multiple RF chain processing on MIMO operations, and more specifically on a number of MIMO layers that may be used for communication, as illustrated by the above two examples, a network entity may need to be informed about a UE's capability to use multiple RF chains at a time for communication.

Accordingly, aspects described herein provide techniques for reporting a UE's multiple RF chains processing capability to a network entity. For example, a UE may send, to a network entity, report(s) indicating a capability of the UE to use multiple RF chains at a single time to communicate across contiguous frequency resources, and more specifically, a capability of the UE to use each of the multiple RF chains to communicate across a subset of the contiguous frequency resources (e.g., a subband of a bandwidth used for communication). The network entity receiving the report(s) comprising such capability information for a UE may use this information when communicating with the UE. For example, the network entity may use this information when determining a number of MIMO layers to use when communicating with the UE.

In certain aspects, in addition to reporting a multiple RF chains processing capability of the UE, additional information may be reported to the network entity to help the network entity determine a number of MIMO layers to use for downlink and/or uplink communication with the UE. In certain aspects, this information includes an explicit indication of a maximum number of MIMO layers supported by the UE when using multiple RF chains at the UE according to the multiple RF chain processing capability of the UE. In certain aspects, this information implicitly indicates, to the network entity, a maximum number of MIMO layers supported by the UE when using multiple RF chains at the UE. For example, the network entity may use the reported information to determine a number of MIMO layers to use when communicating with the UE.

In certain aspects, different antenna elements (or arrays), associated with different RF chains at the UE, may not be co-located at the UE (e.g., these antenna elements/arrays/RF chains may be distributed around an enclosure of the UE). As a result, measurements for different reference signals received and processed by the UE using different RF chains at the UE may be different. For example, where the reference signals sent to the UE include channel state information RSs (CSI-RSs), different channel states may be observed by different RF chains of the UE. Thus, to obtain measurements over a contiguous frequency bandwidth (e.g., wideband), a UE may need to measure different subbands (e.g., different subsets of contiguous frequency resources associated with the wideband) with the same and/or different RF chains at the UE. Certain aspects described herein provide techniques for transmitting, to a UE, configurations of one or more RS occasions configured for communicating one or more RSs spanning the contiguous frequency bandwidth. With this configuration of RS occasions(s) over the bandwidth, a UE may be able to perform reference signal measurements using one or more RF chains at the UE. Accurate RS measurements, such as CSI-RS measurements, may be useful for scheduling and/or resource allocation for efficient communication between the UE and a network entity. Further, in certain aspects, RS measurements may be used by the UE to tune different RF chains at the UE to one or more subbands of a maximum bandwidth at the UE.

Example Operations of Entities in a Communications Network

Figure 6:
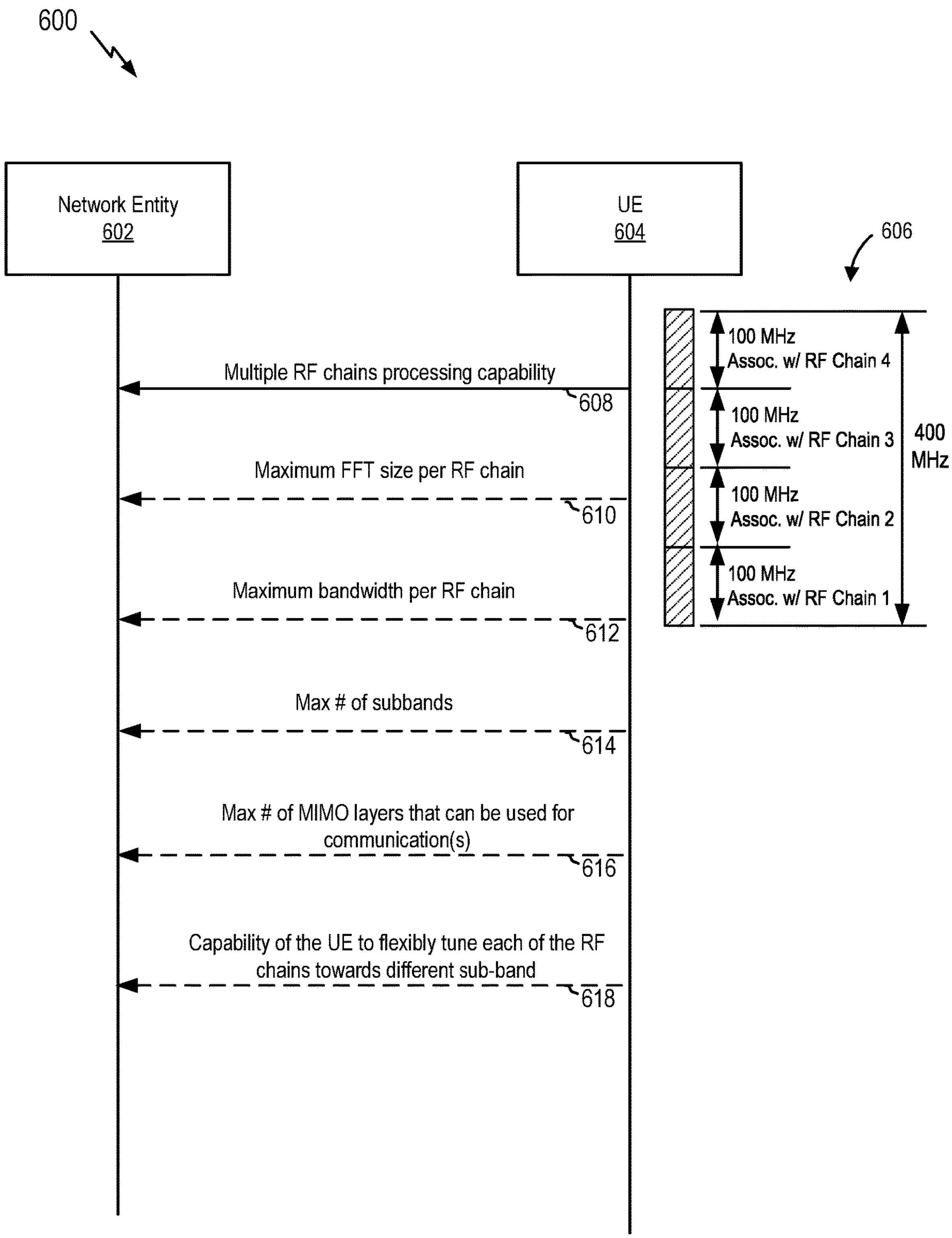
FIG. 6 depicts a process flow for communications in a network between a network entity and a UE to report, at least, a multiple RF chains processing capability of the UE.

FIG. 6 depicts a process flow 600 for communications in a network between a network entity 602 and a UE 604. In certain aspects, the network entity 602 may be an example of the BS 102 depicted and described with respect to FIGS. 1 and 3 or a disaggregated base station depicted and described with respect to FIG. 2. Similarly, the UE 604 may be an example of UE 104 depicted and described with respect to FIGS. 1 and 3. However, in other aspects, UE 604 may be another type of wireless communications device and network entity 602 may be another type of network entity or network node, such as those described herein.

In certain aspects, process flow 600 is used to report, at least, a capability of UE 604 to use multiple RF chains at a time to communicate across contiguous frequency resources (e.g., a bandwidth, such as a 400 MHz carrier bandwidth, which may be supported in 6G and/or later generation wireless technologies). For example, as shown in FIG. 6, at 608, UE 604 sends one or more reports to network entity 602 indicating a multiple RF chains processing capability of UE 604. The multiple RF chains processing capability of UE 604, included in the report(s), may indicate, to network entity 602, that UE 604 is capable of using multiple RF chains at a time to communicate across contiguous frequency resources, where each RF chain is used to communicate across a subset of the contiguous resources (e.g., each RF chain may be used to communicate across a subband of a larger bandwidth).

For example, as shown at 606, UE 604 may be implemented to use four RF chains, where each RF chain is capable of processing a maximum bandwidth of 100 MHz. Accordingly, the indication to network entity 602, included in report(s) sent from UE 604 at 608, may indicate that UE 604 is capable of using multiple of the four RF chains at the UE for wideband communication (e.g., such as a 400 MHz communication), where each RF chain is used to communicate across a respective subband of the wideband communication.

In addition to reporting UE 604's multiple RF chains processing capability, in certain aspects, one or more other indications of capabilities of UE 604 are included in the one or more reports. Indications of other capabilities of UE 604 that may be reported to network entity 602 are shown in process flow 600 by transmissions 610-618. Though shown as separate transmissions, the indications may be all sent in one transmission or report, or in any combination in any number of transmissions or reports.

For example, at 610, UE 604 may send one or more reports to network entity 602 indicating a maximum FFT size per RF chain supported by UE 604. At 612, UE 604 may send one or more reports to network entity 602 indicating a maximum bandwidth per RF chain supported by UE 604. At 614, UE 604 may send one or more reports to network entity 602 indicating a maximum number of subsets of contiguous frequency resources (e.g., subbands) supported by UE 604. In certain aspects, the number of subsets of contiguous frequency resources supported by UE 604 is equal to a maximum number of RF chains implemented at UE 604. In certain other aspects, the number of subsets of contiguous frequency resources supported by UE 604 is less than a maximum number of RF chains implemented at UE 604. For example, UE 604 may be implemented with three RF chains but be configured to use only two of the RF chains for wideband communication, where each of the two RF chains may be used to communicate across a different subband of a larger bandwidth (e.g., two subbands<three RF chains implemented at UE 604).

In certain aspects (as described with respect to FIG. 7A below), capability information sent to network entity 602 at 610, 612, 614, and/or 616 may be used by network entity 602 to determine a maximum number of MIMO layers that may be used for uplink and/or downlink communications with UE 604. As an illustrative example, UE 604 may send one or more reports, to network entity 602, indicating (1) the multiple RF chains processing capability of UE 604 (e.g., at 610), (2) a maximum FFT size per RF chain supported by UE 604 equal to 4K (4,096) (e.g., at 612), and (3) a maximum number of subsets of contiguous frequency resources (e.g., subbands) supported by UE 604 equal to eight (e.g., at 614). Network entity 602 may determine that eight RF chains may be used at UE 604 for wideband downlink communication based on the reported maximum number of subsets of contiguous frequency resources (e.g., subbands) supported by UE 604. Further, network entity 602 may determine that UE 604 may receive a maximum of two layers in a downlink transmission if a 400 MHz bandwidth signal is transmitted with an SCS of 30 kHz. For example, as described herein, a single 400 MHz carrier may include a total of 13,104 tones. To process the 13,104 tones, network entity 602 may determine that UE 604 can use four of its eight RF chains, capable of processing a maximum FFT size of 4K, to process the 400 MHz signal. Thus, because only four of the eight RF chains may be needed to process the 400 MHz signal, network entity 602 may determine that a maximum of two MIMO layers may be used to communicate the 400 MHz signal to UE 604.

In certain aspects, indications of other capabilities of UE 604 that may be reported to network entity 602 include an explicit indication of a maximum number of MIMO layers that are supported by UE 604 when using multiple RF chains to process communications from network entity 602. For example, at 616, UE 604 may send one or more reports to network entity 602 indicating a maximum number of MIMO layers supported by UE 604 when using multiple RF chains to process communications from network entity 602. In some cases, UE 604 may send the indication at 616 as an alternative to indication(s) at 610, 612, and 614, given the capability information reported at 610, 612, and 614 may be used by network entity 602 to derive the maximum number of MIMO layers, which is explicitly reported at 616.

In certain aspects, indications of other capabilities of UE 604 that may be reported to network entity 602 include an indication of a capability of UE 604 to tune each RF chain at UE 604 to multiple subsets of a contiguous frequency band (e.g., tune each RF chain to multiple subbands of a contiguous frequency band). For example, at 618, UE 604 may send one or more reports to network entity 602 indicating this capability. As described in detail below, network entity 602 may use this information to determine an RS configuration, with one or more RS occasions configured for communicating RSs, to send to UE 604.

Although in process flow 600, each indication is transmitted in a separate report to network entity 602 (e.g., at 612, 614, 616, and 618), in some other examples, one or more of these indications may be sent together and/or with the indication of UE 604's capability to use multiple RF chains communicated at 608. Further, the order of different capability indications sent to network entity 602 may be different than the order illustrated in process flow 600.

Figure 7A:
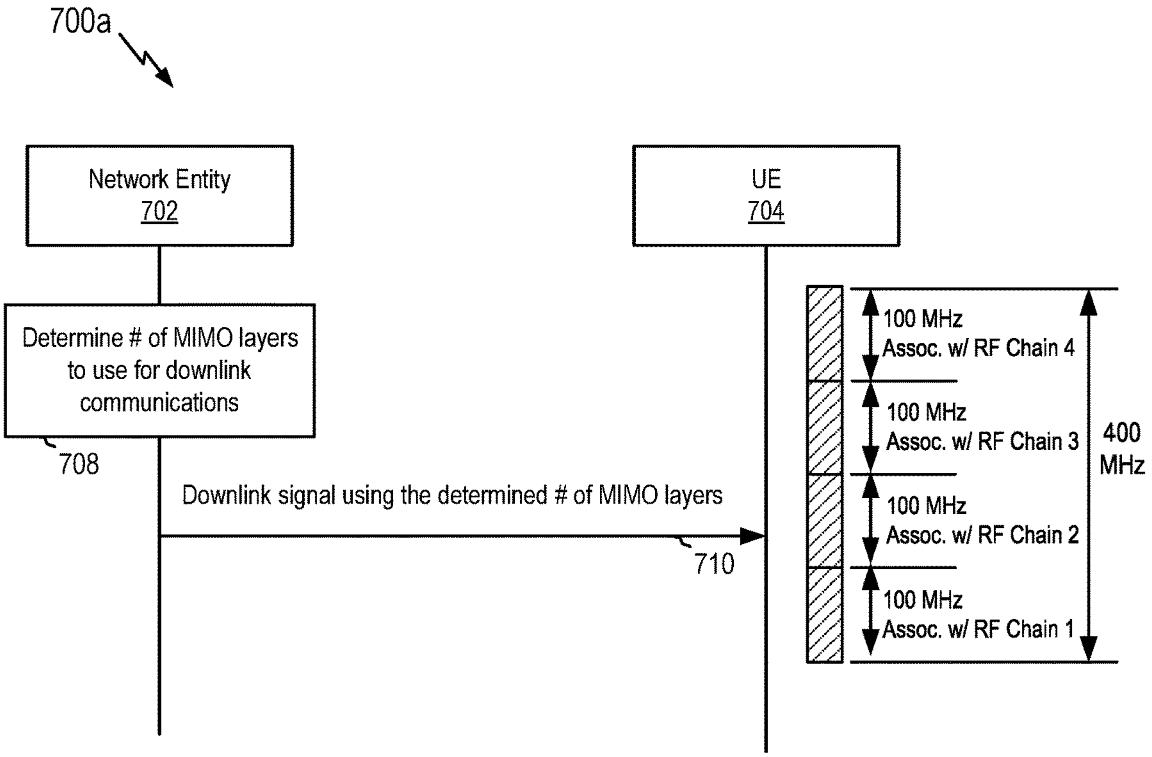
FIGS. 7A and 7B depict process flows for communications in a network between a network entity and a UE to determine a number of multiple-input-multiple-output (MIMO) layer(s) to use for downlink and uplink communications, respectively.
Figure 7B:
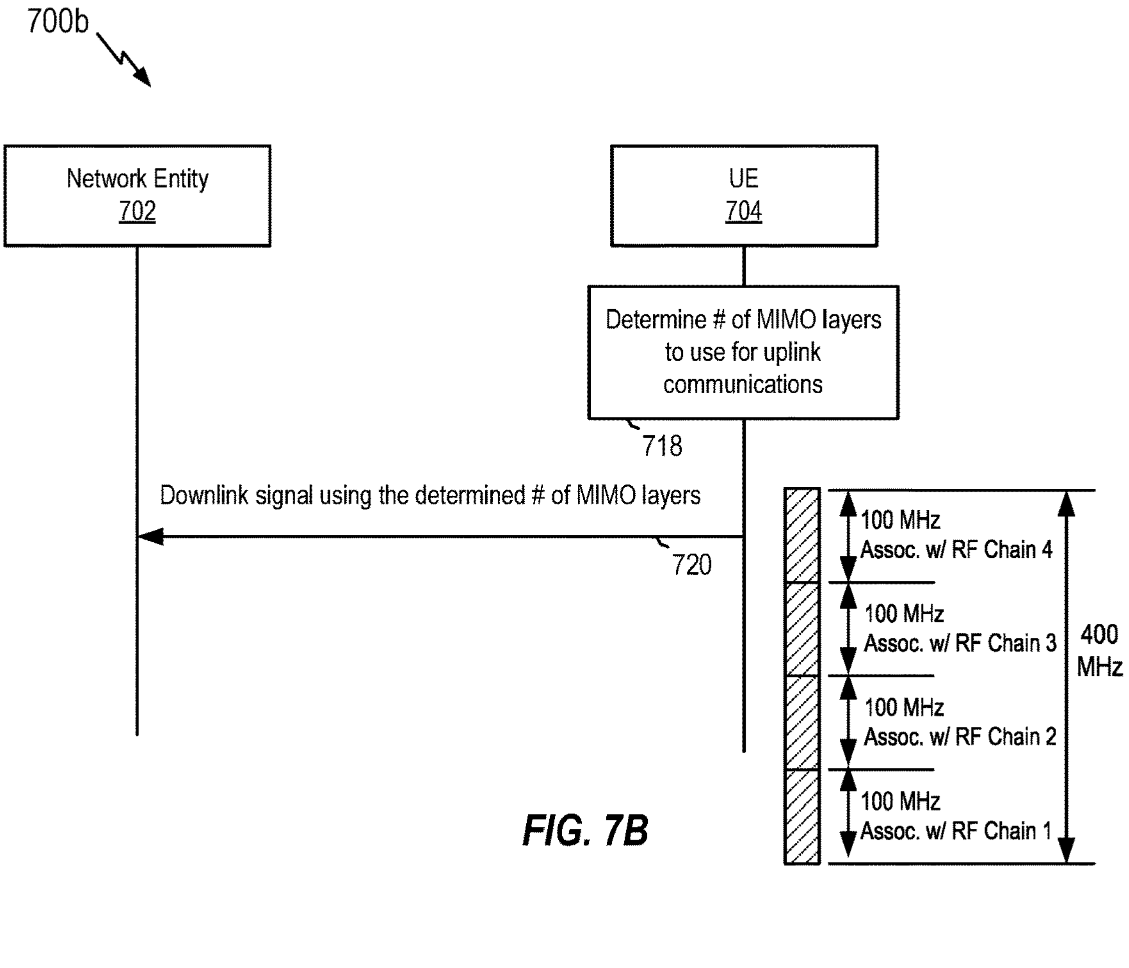

FIGS. 7A and 7B depict process flows 700*a*, 700*b* for communications in a network between a network entity 702 and a UE 704 to determine a number of MIMO layers (e.g., one or more layers up to four layers) to use for downlink and uplink communications, respectively. In certain aspects, the network entity 702 may be an example of the BS 102 depicted and described with respect to FIGS. 1 and 3 or a disaggregated base station depicted and described with respect to FIG. 2. Similarly, the UE 704 may be an example of UE 104 depicted and described with respect to FIGS. 1 and 3. However, in other aspects, UE 704 may be another type of wireless communications device and network entity 702 may be another type of network entity or network node, such as those described herein.

As shown in process flow 700*a* of FIG. 7A, at 708, network entity 702 determines a number of MIMO layers to use for downlink communications with UE 704 when UE 704 is using multiple RF chains for processing downlink communications. As described herein, network entity 702 may make this determination based on (1) an SCS configured for communication between network entity 702 and UE 704, (2) a number of RF chains of UE 704 configured for communication between network entity 702 and UE 704, (3) a maximum fast FFT size per RF chain supported by UE 704 (e.g., which may be communicated to network entity 702, for example, as shown via communication 614 in FIG. 6), (4) a maximum bandwidth per RF chain supported by supported by UE 704 (e.g., which may be communicated to network entity 702, for example, as shown via communication 614 in FIG. 6), and/or (5) a maximum number of subsets of contiguous frequency resources supported by supported by UE 704 (e.g., which may be communicated to network entity 702, for example, as shown via communication 614 in FIG. 6). In certain aspects, network entity 702 makes this determination further based on a maximum bandwidth, where the maximum bandwidth: (1) comprises a bandwidth configured for communication between network entity 702 and UE 704 or (2) is a nominal maximum system bandwidth of network entity 702.

At 710 in process flow 700*a*, network entity 702 sends, to UE 704, a downlink signal across a contiguous frequency bandwidth using the determined number of MIMO layers.

Different from process flow 700*a*, process flow 700*b* in FIG. 7B is used to determine a number of MIMO layers to use for uplink communications with network entity 702 when UE 704 is using multiple RF chains for processing uplink communications for transmission. As shown in process flow 700*b* of FIG. 7B, at 718, UE 704 determines a number of MIMO layers to use for uplink communications with network entity 702 when UE 704 is using multiple RF chains for processing uplink communications. UE 704 may make this determination based on similar information used by network entity 702 when determining a number of MIMO layers to use for downlink communications at 708 in FIG. 7A.

At 720 in process flow 700*b*, UE 704 sends, to network entity 702, an uplink signal across a contiguous frequency bandwidth using the determined number of MIMO layers and multiple RF chains at UE 704.

Figure 8A:
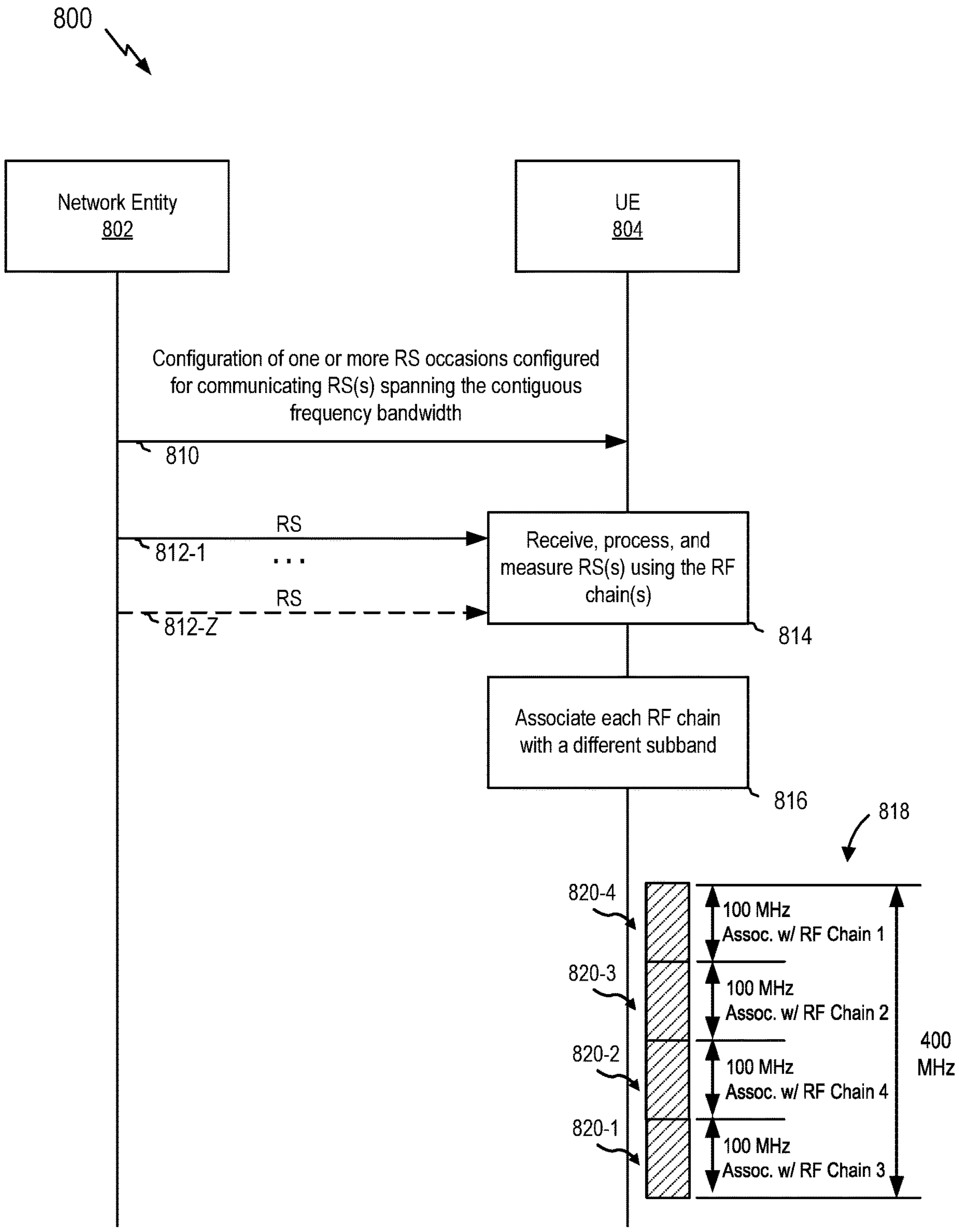
FIG. 8A depicts a process flow for communications in a network between a network entity and a UE to perform reference signal (RS) measurements.

FIG. 8A depicts a process flow 800 for communications in a network between a network entity 802 and a UE 804 to perform RS measurements. In certain aspects, the network entity 802 may be an example of the BS 102 depicted and described with respect to FIGS. 1 and 3 or a disaggregated base station depicted and described with respect to FIG. 2. Similarly, the UE 804 may be an example of UE 104 depicted and described with respect to FIGS. 1 and 3. However, in other aspects, UE 804 may be another type of wireless communications device and network entity 802 may be another type of network entity or network node, such as those described herein.

In certain aspects, process flow 800 is used to communicate, to UE 804, a configuration of RS occasions configured for communicating RS(s) spanning a contiguous frequency bandwidth (e.g., 400 MHz). Based on the configuration, UE 804 may monitor the RS occasions for one or more RSs from network entity 802 to perform one or more RS measurements using the multiple RF chains at UE 804. UE 804 may use the measurements to tune each RF chain of the plurality of RF chains to multiple subsets of the contiguous frequency bandwidth.

For example, as shown in process flow 800 of FIG. 8A, at 810, network entity 802 sends, to UE 804, a configuration of one or more RS occasions configured for communicating RS(s) spanning a contiguous frequency bandwidth. RS occasions are time-frequency resources that UE 804 may monitor for RS(s) from network entity 802.

Figure 8B:
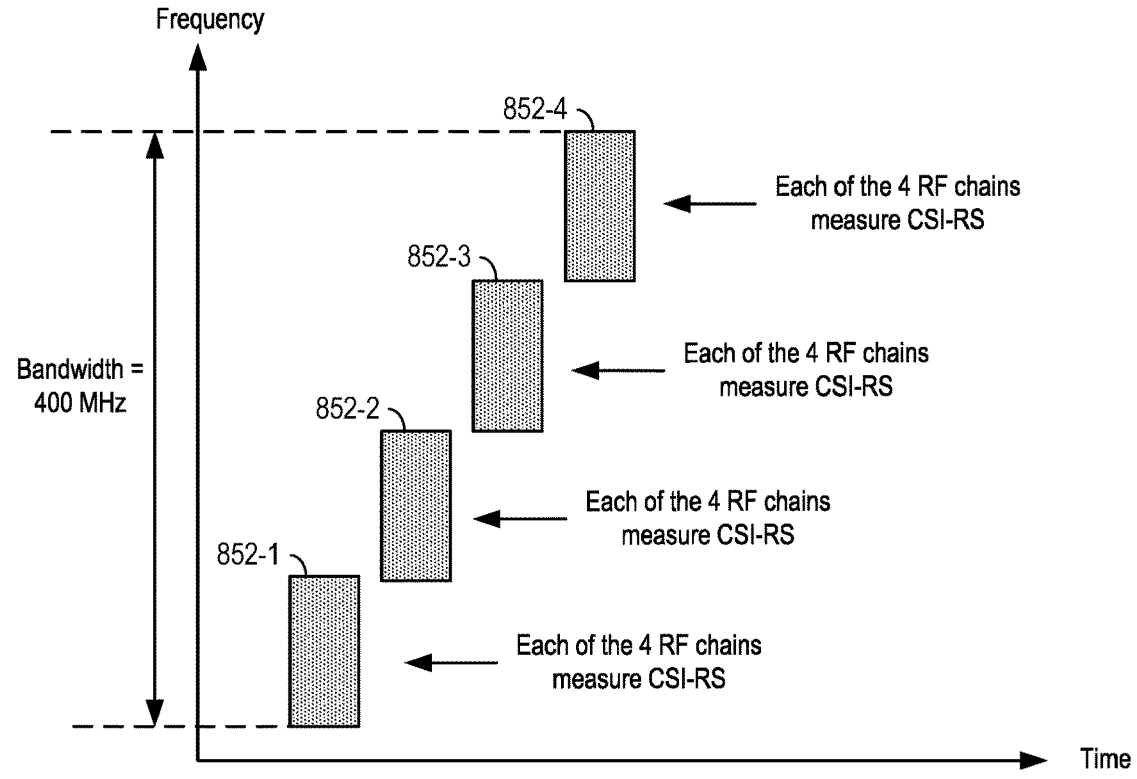
FIGS. 8B and 8C depict example RS configurations configuring one or more RS occasions.

In certain aspects, the RS occasions included in the configuration include multiple RS occasions that span different subsets of the contiguous frequency bandwidth. For example, as shown in FIG. 8B, RS occasions configured at UE 804 may include RS occasions 852-1, 852-2, 852-3, and 852-4 (collectively referred to herein as "RS occasions 852" and individually referred to herein as "RS occasion 852"). Each RS occasion 852 may span a subset of a total 400 MHz bandwidth, also referred to as a subband. For example, RS occasion 852-1 may span a first 100 MHz of the 400 MHz bandwidth, RS occasion 852-2 may span a second 100 MHz of the 400 MHz bandwidth, RS occasion 852-3 may span a third 100 MHz of the 400 MHz bandwidth, and RS occasion 852-4 may span a first four MHz of the 400 MHz bandwidth. RS occasions 852 may also occur at different times. For example, RS occasion 852-1 may occur earlier in time than RS occasion 852-2, RS occasion 852-3, and RS occasion 852-4.

Although FIG. 8B depicts only four RS occasions 852 associated with the configuration received at UE 804, in certain other examples, more or less RS occasions may be associated with the configuration and thus configured at UE 804 for monitoring for RS(s).

Figure 8C:
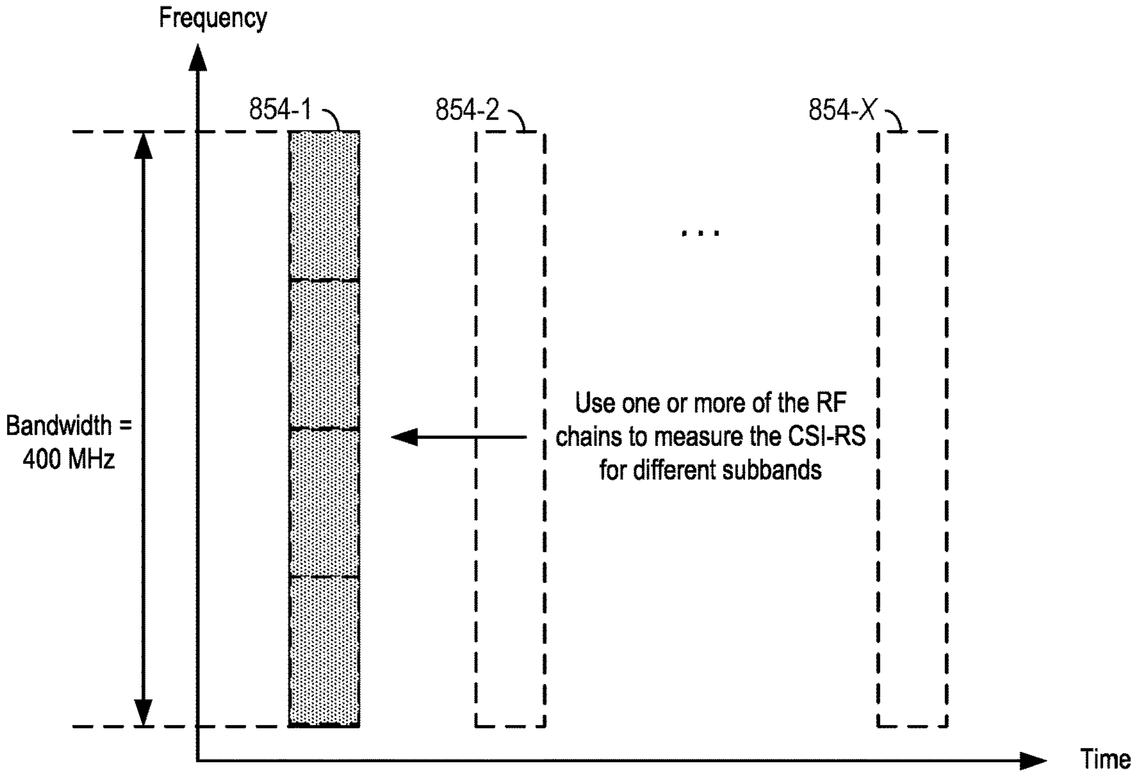

In certain aspects, the RS occasions included in the configuration include RSs that span the entire contiguous frequency bandwidth. For example, as shown in FIG. 8C, RS occasions configured at UE 804 may include RS occasions 854-1 through 854-X (collectively referred to herein as "RS occasions 854" and individually referred to herein as "RS occasion 854") (e.g., where X is an integer greater than one). Each RS occasion 854 may span all contiguous frequency resources of a 400 MHz. In some cases, RS occasions 854-2 through 854-X are RS occasions configured for re-communication of an RS communication in RS occasion 854-1.

Returning to FIG. 8A, UE 804 may monitor one or more RS occasions for one or more RSs based on the configuration received at 810. For example, if the configuration received, by UE 804 at 810, is the configuration of RS occasions 852 depicted in FIG. 8B, UE 804 may monitor for, receive, and process RS(s) in different 100 MHz subbands over time. This monitoring configuration may allow UE 804 to receive and process RS(s) in each subband using each RF chain at UE 804, assuming UE 804 has multiple RF chains with a maximum FFT size of 4K. This monitoring configuration, however, may not enable UE 804 to measure the entire 400 MHz at once using multiple RF chains at UE 804.

Alternatively, if the configuration received, by UE 804 at 810, is the configuration of RS occasion(s) 854 depicted in FIG. 8C, UE 804 may monitor for, receive, and process an RS(s) transmitted across the entire 400 MHz bandwidth. However, UE 804 may need to use multiple RF chains at the UE to measure different subbands of the 400 MHz RS. Thus, with this configuration, less RS occasions may be configured and/or needed to generate a measurement for the 400 MHz bandwidth; however, not every RF chain at UE 804 may be used to measure every subband of the 400 MHz bandwidth.

Based on monitoring RS occasions 852 in FIG. 8B and/or RS occasion(s) 854 in FIG. 8C, at 814, UE 804 may receive, process, and measure one or more RSs (e.g., RSs 812-1 through 812-Z (collectively referred to herein as RSs 812), where Z is an integer greater than one) using multiple RF chains at UE 804. In certain aspects, the one or more RSs 812 are CSI-RS, and UE 804 measures each CSI-RS to determine channel state information measured by one or more RF chains for multiple subbands of the 400 MHz bandwidth.

Based on the measurement information, UE 804 may associate each RF chain with a different subband for processing. For example, a first RF chain at UE 804 may or may not be associated with a first subband of a configured bandwidth at UE 804 or a nominal maximum system bandwidth, a second RF chain at UE 804 may or may not be associated with a second subband of a configured bandwidth at UE 804 or a nominal maximum system bandwidth, etc. Instead, UE 804 may use the measurements to associate different RF chains with different subbands for processing. For example, an RF chain with a "best" RS measurement, such as a measurement for a CSI-RS indicating best channel conditions, for a subband, may be associated with that subband. As an illustrative example shown at 818 in FIG. 8A, UE 804 may associate a third RF chain at UE 804 with a first subband 820-1, associate a fourth RF chain at UE 804 with a second subband 820-2, associate a second RF chain at UE 804 with a third subband 820-3, and associated a first RF chain at UE 804 with a fourth subband 820-4. Associating each RF chain of UE 804 with a subband of a configured frequency bandwidth may involve tuning each RF chain (e.g., each filter) of UE 804 to a subband of the configured frequency bandwidth. Although the example, in FIG. 8A depicts each RF chain being tuned to a single subband, in some other examples, an RF chain may be tuned to multiple subbands.

Example Operations

Figure 9:
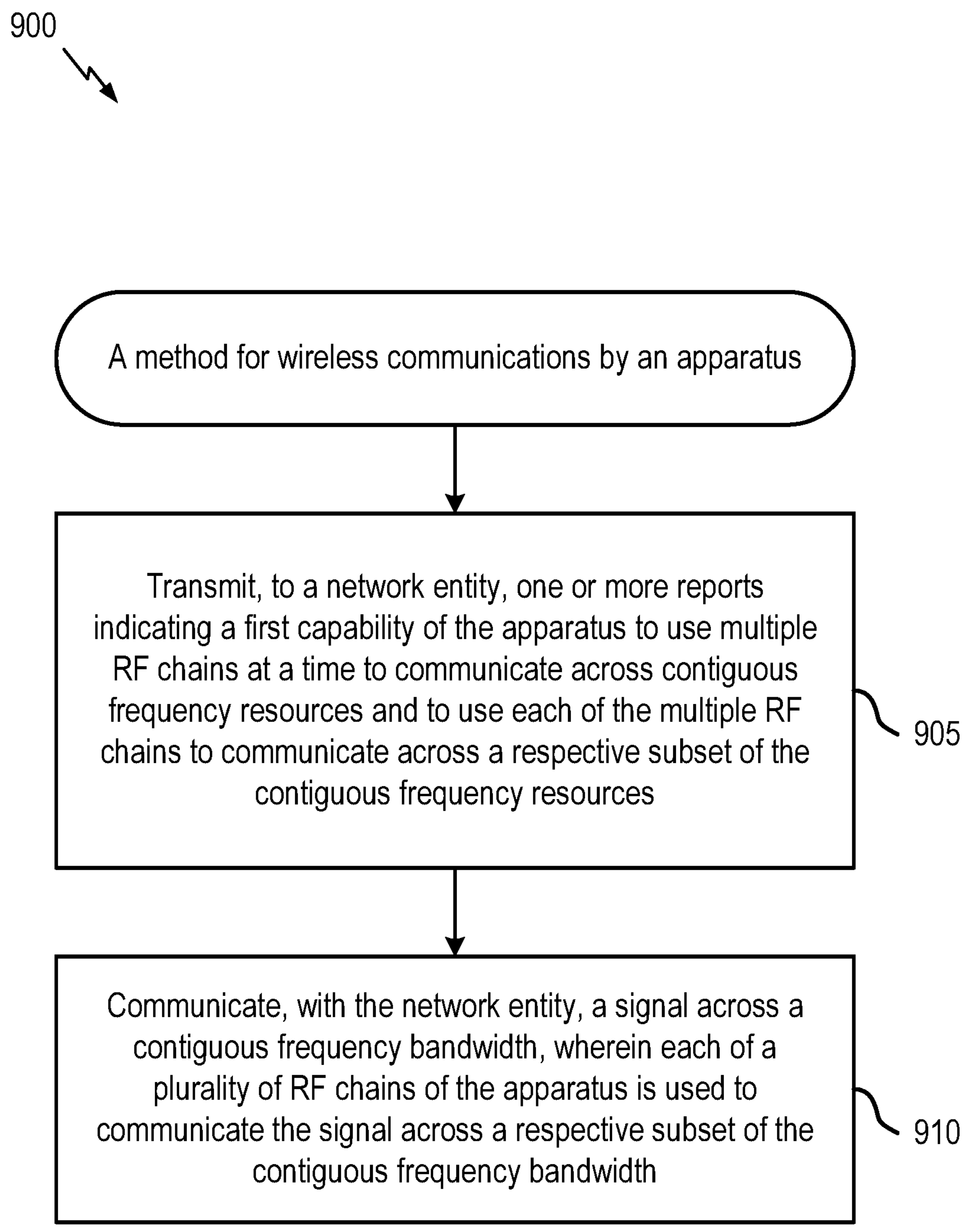
FIG. 9 depicts a method for wireless communications.

FIG. 9 shows a method 900 for wireless communications by an apparatus, such as UE 104 of FIGS. 1 and 3.

Method 900 begins at block 905 with transmitting, to a network entity, one or more reports indicating a first capability of the apparatus to use multiple RF chains at a time to communicate across contiguous frequency resources and to use each of the multiple RF chains to communicate across a respective subset of the contiguous frequency resources.

Method 900 then proceeds to block 910 with communicating, with the network entity, a signal across a contiguous frequency bandwidth, wherein each of a plurality of RF chains of the apparatus is used to communicate the signal across a respective subset of the contiguous frequency bandwidth.

In certain aspects, the one or more reports further indicate a maximum FFT size per RF chain supported by the apparatus.

In certain aspects, the one or more reports further indicate a maximum bandwidth per RF chain supported by the apparatus.

In certain aspects, the one or more reports further indicate a maximum number of subsets of contiguous frequency resources supported by the apparatus.

In certain aspects, the one or more reports further indicate a maximum number of MIMO layers supported by the apparatus when operating according to the first capability of using multiple RF chains to communicate across contiguous frequency resources.

In certain aspects, a maximum number of MIMO layers supported by the apparatus when operating according to the first capability of using multiple RF chains to communicate across contiguous frequency resources is based on at least one of: a maximum bandwidth; a SCS configured for communication between the network entity and the apparatus; a number of RF chains of the apparatus configured for communication between the network entity and the apparatus; a maximum FFT size per RF chain supported by the apparatus; a maximum bandwidth per RF chain supported by the apparatus; or a maximum number of subsets of contiguous frequency resources supported by the apparatus.

In certain aspects, the maximum bandwidth comprises a bandwidth configured for communication between the network entity and the apparatus.

In certain aspects, the maximum bandwidth comprises a nominal maximum system bandwidth of the network entity.

In certain aspects, method 900 further includes receiving a configuration of one or more reference signal occasions configured for communicating one or more reference signals spanning the contiguous frequency bandwidth.

In certain aspects, each of the one or more reference signal occasions spans the contiguous frequency bandwidth.

In certain aspects, each of the one or more reference signal occasions spans a respective subset of the contiguous frequency bandwidth.

In certain aspects, the one or more reports further indicate a second capability of the apparatus to tune each RF chain of the plurality of RF chains to multiple subsets of the contiguous frequency bandwidth.

In certain aspects, the signal carries control information.

In certain aspects, block 910 includes: receiving the signal; or transmitting the signal.

Figure 11:
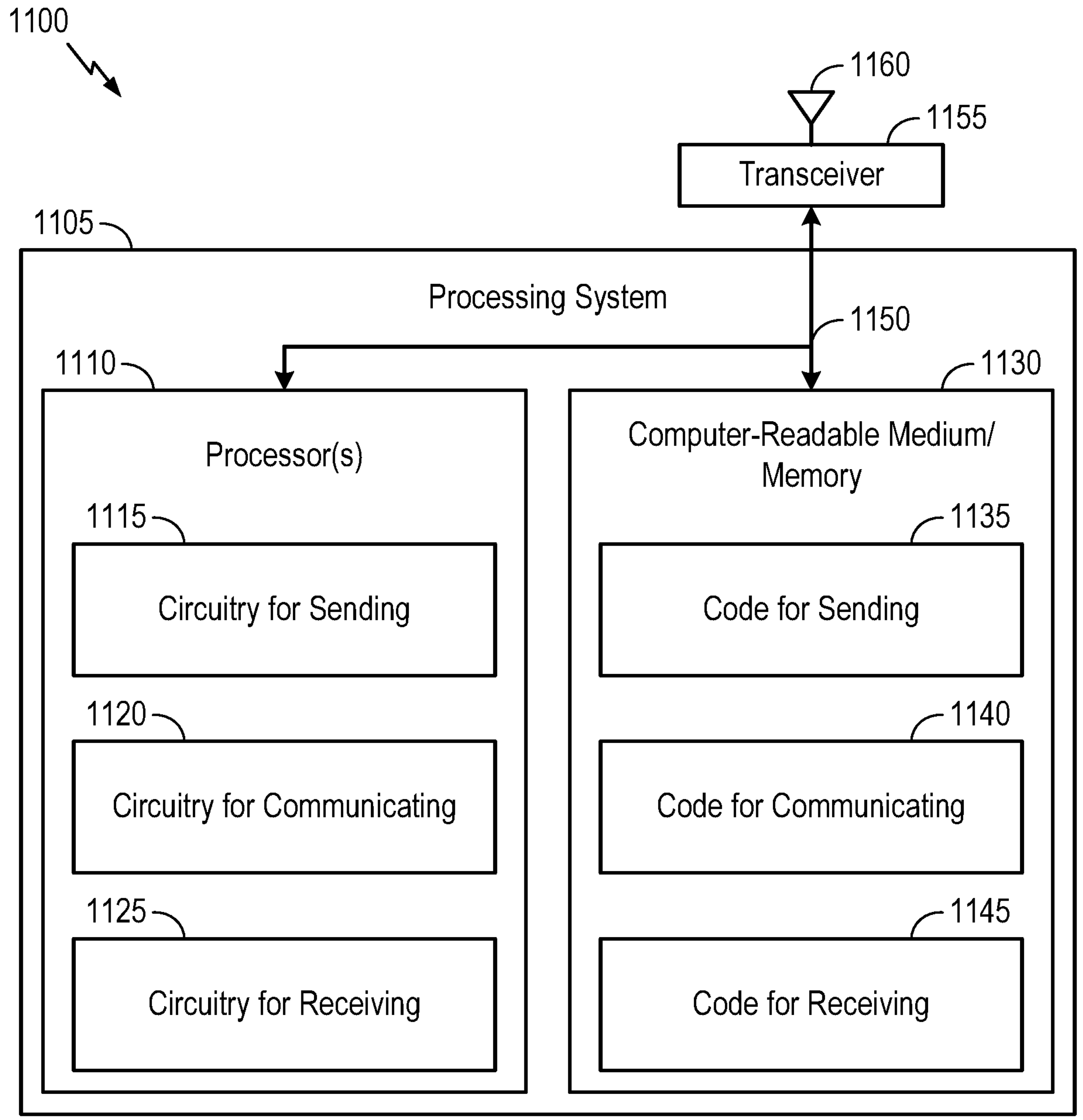
FIG. 11 depicts aspects of an example communications device.

In certain aspects, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative operations are possible consistent with this disclosure.

Figure 10:
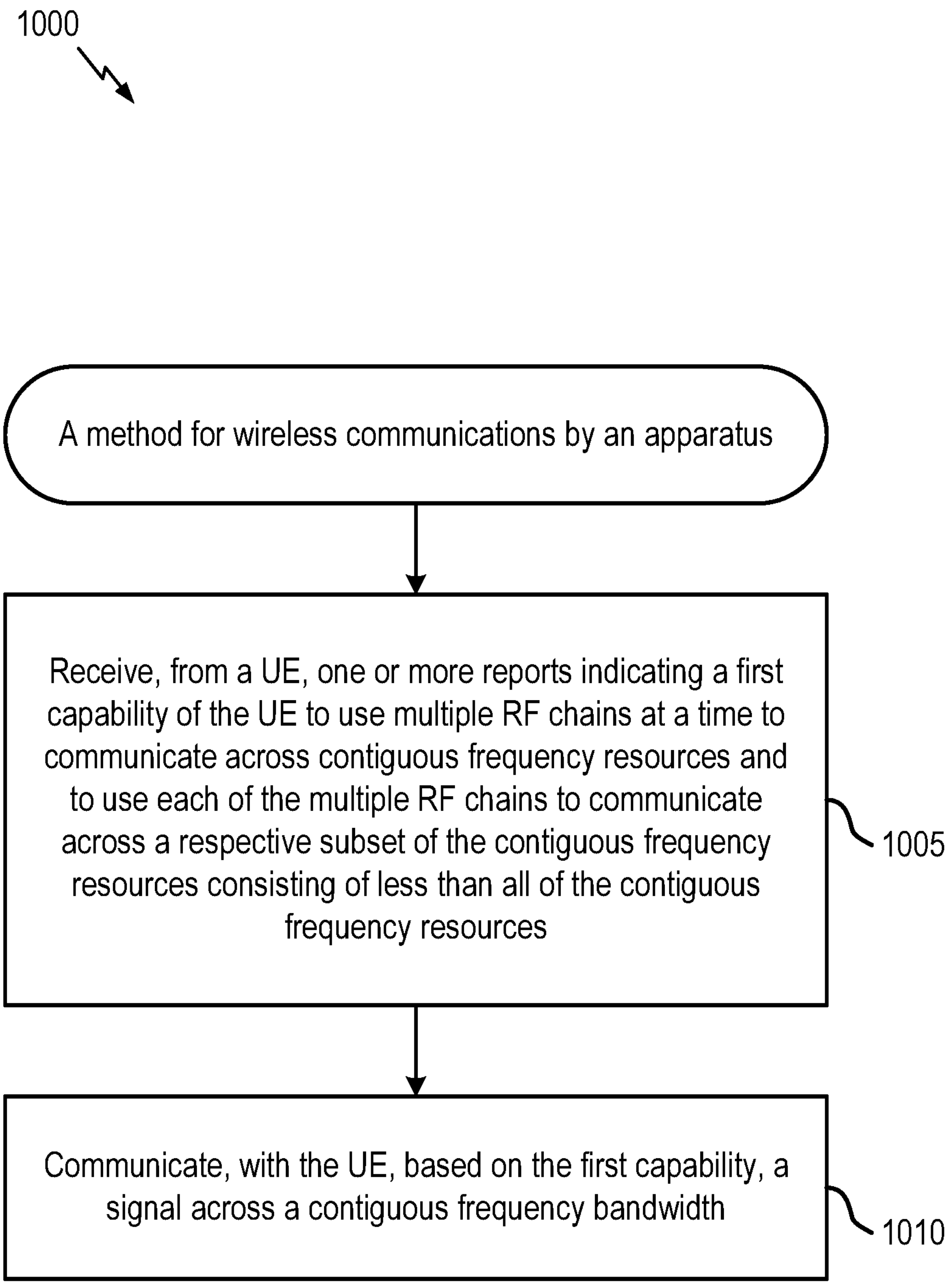
FIG. 10 depicts another method for wireless communications.

FIG. 10 shows a method 1000 for wireless communications by an apparatus, such as BS 102 of FIGS. 1 and 3, or a disaggregated base station as discussed with respect to FIG. 2.

Method 1000 begins at block 1005 with receiving, from a UE, one or more reports indicating a first capability of the UE to use multiple RF chains at a time to communicate across contiguous frequency resources and to use each of the multiple RF chains to communicate across a respective subset of the contiguous frequency resources consisting of less than all of the contiguous frequency resources.

Method 1000 then proceeds to block 1010 with communicating, with the UE, based on the first capability, a signal across a contiguous frequency bandwidth.

In certain aspects, the one or more reports further indicate a maximum FFT size per RF chain supported by the UE.

In certain aspects, the one or more reports further indicate a maximum bandwidth per RF chain supported by the UE.

In certain aspects, the one or more reports further indicate a maximum number of subsets of contiguous frequency resources supported by the UE.

In certain aspects, the one or more reports further indicate a maximum number of MIMO layers supported by the UE when operating according to the first capability of using multiple RF chains to communicate across contiguous frequency resources.

In certain aspects, method 1000 further includes determining a maximum number of MIMO layers supported by the UE when the UE is operating according to the first capability of using multiple RF chains to communicate across contiguous frequency resources is based on at least one of: a maximum bandwidth; a SCS configured for communication between the apparatus and the UE; a number of RF chains of the UE configured for communication between the apparatus and the UE; a maximum FFT size per RF chain supported by the UE; a maximum bandwidth per RF chain supported by the UE; or a maximum number of subsets of contiguous frequency resources supported by the UE.

In certain aspects, the maximum bandwidth comprises a bandwidth configured for communication between the UE and the apparatus.

In certain aspects, the maximum bandwidth comprises a nominal maximum system bandwidth of the apparatus.

In certain aspects, method 1000 further includes transmitting a configuration of one or more reference signal occasions configured for communicating one or more reference signals spanning the contiguous frequency bandwidth.

In certain aspects, each of the one or more reference signal occasions spans the contiguous frequency bandwidth.

In certain aspects, each of the one or more reference signal occasions spans a respective subset of the contiguous frequency bandwidth.

In certain aspects, the one or more reports further indicate a second capability of the UE to tune each RF chain of a plurality of RF chains of the UE to multiple subsets of the contiguous frequency bandwidth.

In certain aspects, the signal carries control information.

In certain aspects, block 1010 includes: transmitting the signal; or receiving the signal.

Figure 12:
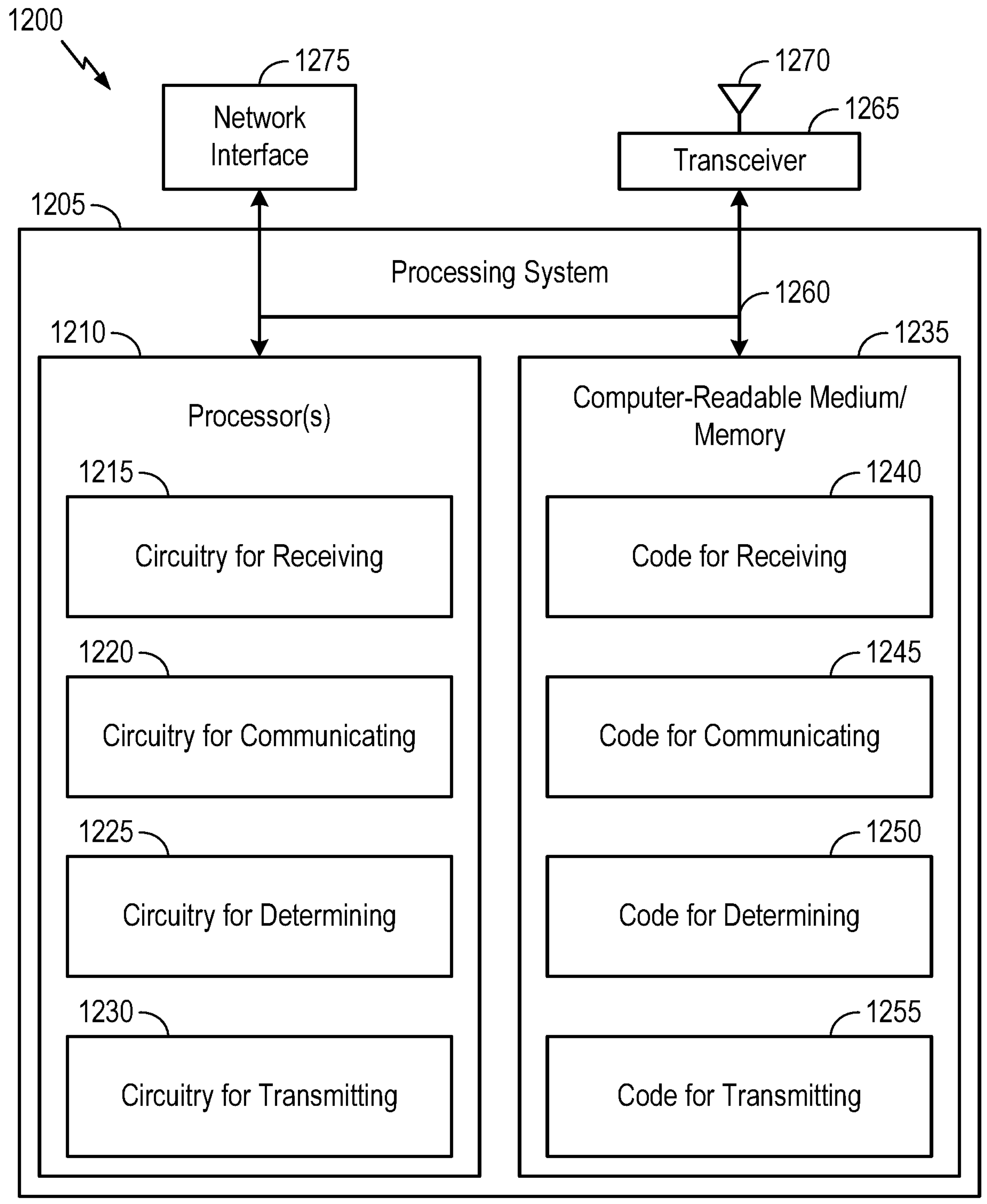
FIG. 12 depicts aspects of an example communications device.

In certain aspects, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative operations are possible consistent with this disclosure.

Example Communications Devices

FIG. 11 depicts aspects of an example communications device 1100. In some aspects, communications device 1100 is a user equipment, such as UE 104 described above with respect to FIGS. 1 and 3.

The communications device 1100 includes a processing system 1105 coupled to a transceiver 1155 (e.g., a transmitter and/or a receiver). The transceiver 1155 is configured to transmit and receive signals for the communications device 1100 via an antenna 1160, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1130 via a bus 1150. In certain aspects, the computer-readable medium/memory 1130 is configured to store instructions (e.g., computer-executable code) that when executed by the one or more processors 1110, enable and cause the one or more processors 1110 to perform the method 900 described with respect to FIG. 9, or any aspect related to it, including any operations described in relation to FIG. 9. Note that reference to a processor performing a function of communications device 1100 may include one or more processors performing that function of communications device 1100, such as in a distributed fashion.

In the depicted example, computer-readable medium/memory 1130 stores code for sending 1135, code for communicating 1140, and code for receiving 1145. Processing of the code 1135-1145 may enable and cause the communications device 1100 to perform the method 900 described with respect to FIG. 9, or any aspect related to it.

The one or more processors 1110 include circuitry configured to implement (e.g., execute) the code stored in the computer-readable medium/memory 1130, including circuitry for sending 1115, circuitry for communicating 1120, and circuitry for receiving 1125. Processing with circuitry 1115-1125 may enable and cause the communications device 1100 to perform the method 900 described with respect to FIG. 9, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 1155 and/or antenna 1160 of the communications device 1100 in FIG. 11, and/or one or more processors 1110 of the communications device 1100 in FIG. 11. Means for communicating, receiving or obtaining may include the transceivers 354, antenna(s) 352, receive processor 358, AI processor 370, and/or controller/processor 380 of the UE 104 illustrated in FIG. 3, transceiver 1155 and/or antenna 1160 of the communications device 1100 in FIG. 11, and/or one or more processors 1110 of the communications device 1100 in FIG. 11.

FIG. 12 depicts aspects of an example communications device 1200. In some aspects, communications device 1200 is a network entity, such as BS 102 of FIGS. 1 and 3, or a disaggregated base station as discussed with respect to FIG. 2.

The communications device 1200 includes a processing system 1205 coupled to a transceiver 1265 (e.g., a transmitter and/or a receiver) and/or a network interface 1275. The transceiver 1265 is configured to transmit and receive signals for the communications device 1200 via an antenna 1270, such as the various signals as described herein. The network interface 1275 is configured to obtain and send signals for the communications device 1200 via communications link(s), such as a backhaul link, midhaul link, and/or fronthaul link as described herein, such as with respect to FIG. 2. The processing system 1205 may be configured to perform processing functions for the communications device 1200, including processing signals received and/or to be transmitted by the communications device 1200.

The processing system 1205 includes one or more processors 1210. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1235 via a bus 1260. In certain aspects, the computer-readable medium/memory 1235 is configured to store instructions (e.g., computer-executable code) that when executed by the one or more processors 1210, enable and cause the one or more processors 1210 to perform the method 1000 described with respect to FIG. 10, or any aspect related to it, including any operations described in relation to FIG. 10. Note that reference to a processor of communications device 1200 performing a function may include one or more processors of communications device 1200 performing that function, such as in a distributed fashion.

In the depicted example, the computer-readable medium/memory 1235 stores code for receiving 1240, code for communicating 1245, code for determining 1250, and code for transmitting 1255. Processing of the code 1240-1255 may enable and cause the communications device 1200 to perform the method 1000 described with respect to FIG. 10, or any aspect related to it.

The one or more processors 1210 include circuitry configured to implement (e.g., execute) the code stored in the computer-readable medium/memory 1235, including circuitry for receiving 1215, circuitry for communicating 1220, circuitry for determining 1225, and circuitry for transmitting 1230. Processing with circuitry 1215-1230 may enable and cause the communications device 1200 to perform the method 1000 described with respect to FIG. 10, or any aspect related to it.

More generally, means for communicating, transmitting, sending or outputting for transmission may include the transceivers 332, antenna(s) 334, transmit processor 320, TX MIMO processor 330, AI processor 318, and/or controller/processor 340 of the BS 102 illustrated in FIG. 3, transceiver 1265, antenna 1270, and/or network interface 1275 of the communications device 1200 in FIG. 12, and/or one or more processors 1210 of the communications device 1200 in FIG. 12. Means for communicating, receiving or obtaining may include the transceivers 332, antenna(s) 334, receive processor 338, AI processor 318, and/or controller/processor 340 of the BS 102 illustrated in FIG. 3, transceiver 1265, antenna 1270, and/or network interface 1275 of the communications device 1200 in FIG. 12, and/or one or more processors 1210 of the communications device 1200 in FIG. 12.

EXAMPLE CLAUSES

Implementation examples are described in the following numbered clauses:

Clause 1: A method for wireless communications by an apparatus comprising: transmitting, to a network entity, one or more reports indicating a first capability of the apparatus to use multiple RF chains at a time to communicate across contiguous frequency resources and to use each of the multiple RF chains to communicate across a respective subset of the contiguous frequency resources; and communicating, with the network entity, a signal across a contiguous frequency bandwidth, wherein each of a plurality of RF chains of the apparatus is used to communicate the signal across a respective subset of the contiguous frequency bandwidth.

Clause 2: The method of Clause 1, wherein the one or more reports further indicate a maximum FFT size per RF chain supported by the apparatus.

Clause 3: The method of any one of Clauses 1-2, wherein the one or more reports further indicate a maximum bandwidth per RF chain supported by the apparatus.

Clause 4: The method of any one of Clauses 1-3, wherein the one or more reports further indicate a maximum number of subsets of contiguous frequency resources supported by the apparatus.

Clause 5: The method of any one of Clauses 1-4, wherein the one or more reports further indicate a maximum number of MIMO layers supported by the apparatus when operating according to the first capability of using multiple RF chains to communicate across contiguous frequency resources.

Clause 6: The method of any one of Clauses 1-5, wherein a maximum number of MIMO layers supported by the apparatus when operating according to the first capability of using multiple RF chains to communicate across contiguous frequency resources is based on at least one of: a maximum bandwidth; a SCS configured for communication between the network entity and the apparatus; a number of RF chains of the apparatus configured for communication between the network entity and the apparatus; a maximum FFT size per RF chain supported by the apparatus; a maximum bandwidth per RF chain supported by the apparatus; or a maximum number of subsets of contiguous frequency resources supported by the apparatus.

Clause 7: The method of Clause 6, wherein the maximum bandwidth comprises a bandwidth configured for communication between the network entity and the apparatus.

Clause 8: The method of Clause 6, wherein the maximum bandwidth comprises a nominal maximum system bandwidth of the network entity.

Clause 9: The method of any one of Clauses 1-8, further comprising: receiving a configuration of one or more reference signal occasions configured for communicating one or more reference signals spanning the contiguous frequency bandwidth.

Clause 10: The method of Clause 9, wherein each of the one or more reference signal occasions spans the contiguous frequency bandwidth.

Clause 11: The method of Clause 9, wherein each of the one or more reference signal occasions spans a respective subset of the contiguous frequency bandwidth.

Clause 12: The method of any one of Clauses 1-11, wherein the one or more reports further indicate a second capability of the apparatus to tune each RF chain of the plurality of RF chains to multiple subsets of the contiguous frequency bandwidth.

Clause 13: The method of any one of Clauses 1-12, wherein the signal carries control information.

Clause 14: The method of any one of Clauses 1-13, wherein communicating the signal comprises: receiving the signal; or transmitting the signal.

Clause 15: A method for wireless communications by an apparatus comprising: receiving, from a UE, one or more reports indicating a first capability of the UE to use multiple RF chains at a time to communicate across contiguous frequency resources and to use each of the multiple RF chains to communicate across a respective subset of the contiguous frequency resources consisting of less than all of the contiguous frequency resources; and communicating, with the UE, based on the first capability, a signal across a contiguous frequency bandwidth.

Clause 16: The method of Clause 15, wherein the one or more reports further indicate a maximum FFT size per RF chain supported by the UE.

Clause 17: The method of any one of Clauses 15-16, wherein the one or more reports further indicate a maximum bandwidth per RF chain supported by the UE.

Clause 18: The method of any one of Clauses 15-17, wherein the one or more reports further indicate a maximum number of subsets of contiguous frequency resources supported by the UE.

Clause 19: The method of any one of Clauses 15-18, wherein the one or more reports further indicate a maximum number of MIMO layers supported by the UE when operating according to the first capability of using multiple RF chains to communicate across contiguous frequency resources.

Clause 20: The method of any one of Clauses 15-19, further comprising determining a maximum number of MIMO layers supported by the UE when the UE is operating according to the first capability of using multiple RF chains to communicate across contiguous frequency resources is based on at least one of: a maximum bandwidth; a SCS configured for communication between the apparatus and the UE; a number of RF chains of the UE configured for communication between the apparatus and the UE; a maximum FFT size per RF chain supported by the UE; a maximum bandwidth per RF chain supported by the UE; or a maximum number of subsets of contiguous frequency resources supported by the UE.

Clause 21: The method of Clause 20, wherein the maximum bandwidth comprises a bandwidth configured for communication between the UE and the apparatus.

Clause 22: The method of Clause 20, wherein the maximum bandwidth comprises a nominal maximum system bandwidth of the apparatus.

Clause 23: The method of any one of Clauses 15-22, further comprising: transmitting a configuration of one or more reference signal occasions configured for communicating one or more reference signals spanning the contiguous frequency bandwidth.

Clause 24: The method of Clause 23, wherein each of the one or more reference signal occasions spans the contiguous frequency bandwidth.

Clause 25: The method of Clause 23, wherein each of the one or more reference signal occasions spans a respective subset of the contiguous frequency bandwidth.

Clause 26: The method of any one of Clauses 15-25, wherein the one or more reports further indicate a second capability of the UE to tune each RF chain of a plurality of RF chains of the UE to multiple subsets of the contiguous frequency bandwidth.

Clause 27: The method of any one of Clauses 15-26, wherein the signal carries control information.

Clause 28: The method of any one of Clauses 15-27, wherein communicating the signal comprises: transmitting the signal; or receiving the signal.

Clause 29: One or more apparatuses, comprising: one or more memories comprising executable instructions; and one or more processors configured to execute the executable instructions and cause the one or more apparatuses to perform a method in accordance with any one of Clauses 1-28.

Clause 30: One or more apparatuses, comprising: one or more memories; and one or more processors, coupled to the one or more memories, configured to cause the one or more apparatuses to perform a method in accordance with any one of Clauses 1-28.

Clause 31: One or more apparatuses, comprising: one or more memories; and one or more processors, coupled to the one or more memories, configured to perform a method in accordance with any one of Clauses 1-28.

Clause 32: One or more apparatuses, comprising means for performing a method in accordance with any one of Clauses 1-28.

Clause 33: One or more non-transitory computer-readable media comprising executable instructions that, when executed by one or more processors of one or more apparatuses, cause the one or more apparatuses to perform a method in accordance with any one of Clauses 1-28.

Clause 34: One or more computer program products embodied on one or more computer-readable storage media comprising code for performing a method in accordance with any one of Clauses 1-28.

Clause 35: A user equipment (UE), comprising: a processing system that includes processor circuitry and memory circuitry that stores code and is coupled with the processor circuitry, the processing system configured to cause the UE to perform a method in accordance with any one of Clauses 1-14.

Clause 36: A network entity, comprising: a processing system that includes processor circuitry and memory circuitry that stores code and is coupled with the processor circuitry, the processing system configured to cause the network entity to perform a method in accordance with any one of Clauses 15-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:

one or more memories; and one or more processors coupled to the one or more memories, the one or more processors being configured to cause the apparatus to:

transmit, to a network entity, one or more reports that indicate a first capability of the apparatus to:

use multiple radio frequency (RF) chains at a time to communicate across contiguous frequency resources, and use each RF chain, of the multiple RF chains, to communicate across a respective non-overlapping subset of the contiguous frequency resources; and communicate, with the network entity, a signal across a contiguous frequency bandwidth, wherein each RE chain, of a plurality of RF chains of the apparatus, is used to communicate a respective portion of the signal across a respective non-overlapping subset of the contiguous frequency bandwidth.

2. The apparatus of claim 1, wherein the one or more reports further indicate a maximum fast Fourier transform (FFT) size per RF chain supported by the apparatus.

3. The apparatus of claim 1, wherein the one or more reports further indicate a maximum bandwidth per RF chain supported by the apparatus.

4. The apparatus of claim 1, wherein the one or more reports further indicate a maximum number of subsets of contiguous frequency resources supported by the apparatus.

5. The apparatus of claim 1, wherein the one or more reports further indicate a maximum number of multi-input-multiple-output (MIMO) layers supported by the apparatus when operating according to the first capability.

6. The apparatus of claim 1, wherein a maximum number of multi-input-multiple-output (MIMO) layers supported by the apparatus when operating according to the first capability is based on at least one of:

a maximum bandwidth;

a subcarrier spacing (SCS) configured for communication between the network entity and the apparatus;

a number of RF chains of the apparatus configured for communication between the network entity and the apparatus;

a maximum fast Fourier transform (FFT) size per RF chain supported by the apparatus;

a maximum bandwidth per RF chain supported by the apparatus; or a maximum number of subsets of contiguous frequency resources supported by the apparatus.

7. The apparatus of claim 6, wherein the maximum bandwidth comprises a bandwidth configured for communication between the network entity and the apparatus.

8. The apparatus of claim 6, wherein the maximum bandwidth comprises a nominal maximum system bandwidth of the network entity.

9. The apparatus of claim 1, wherein the one or more processors are configured to cause the apparatus to:

receive a configuration of one or more reference signal occasions configured for communication of one or more reference signals that span the contiguous frequency bandwidth.

10. The apparatus of claim 9, wherein each reference signal occasion, of the one or more reference signal occasions, spans the contiguous frequency bandwidth.

11. The apparatus of claim 9, wherein each reference signal occasion, of the one or more reference signal occasions, spans a respective subset of the contiguous frequency bandwidth.

12. The apparatus of claim 1, wherein the one or more reports further indicate a second capability of the apparatus to tune each RF chain, of the plurality of RF chains, to multiple subsets of the contiguous frequency bandwidth.

13. The apparatus of claim 1, wherein the signal carries control information.

14. The apparatus of claim 1, wherein to communicate the signal, the one or more processors are configured to:

receive the signal; or transmit the signal.

15. An apparatus configured for wireless communications, comprising:

one or more memories; and one or more processors coupled to the one or more memories, the one or more processors being configured to cause the apparatus to:

receive, from a user equipment (UE), one or more reports that indicate a first capability of the UE to:

use multiple radio frequency (RF) chains at a time to communicate across contiguous frequency resources, and use each RE chain, of the multiple RF chains, to communicate across a respective non-overlapping subset of the contiguous frequency resources that consists of less than all of the contiguous frequency resources; and communicate, with the UE, based on the first capability, a signal across a contiguous frequency bandwidth.

16. The apparatus of claim 15, wherein the one or more reports further indicate a maximum fast Fourier transform (FFT) size per RF chain supported by the UE.

17. The apparatus of claim 15, wherein the one or more reports further indicate a maximum bandwidth per RF chain supported by the UE.

18. The apparatus of claim 15, wherein the one or more reports further indicate a maximum number of subsets of contiguous frequency resources supported by the UE.

19. The apparatus of claim 15, wherein the one or more reports further indicate, for the first capability, a maximum number of multi-input-multiple-output (MIMO) layers supported by the UE.

20. The apparatus of claim 15, wherein the one or more processors are configured to cause the apparatus to determine a maximum number of multi-input-multiple-output (MIMO) layers supported by the UE, for the first capability, based on at least one of:

a maximum bandwidth;

a subcarrier spacing (SCS) configured for communication between the apparatus and the UE;

a number of RF chains of the UE configured for communication between the apparatus and the UE;

a maximum fast Fourier transform (FFT) size per RF chain supported by the UE;

a maximum bandwidth per RF chain supported by the UE; or a maximum number of subsets of contiguous frequency resources supported by the UE.

21. The apparatus of claim 20, wherein the maximum bandwidth comprises a bandwidth configured for communication between the UE and the apparatus.

22. The apparatus of claim 20, wherein the maximum bandwidth comprises a nominal maximum system bandwidth of the apparatus.

23. The apparatus of claim 15, wherein the one or more processors are configured to cause the apparatus to:

transmit a configuration of one or more reference signal occasions configured for communication of one or more reference signals that span the contiguous frequency bandwidth.

24. The apparatus of claim 23, wherein each reference signal occasion, of the one or more reference signal occasions, spans the contiguous frequency bandwidth.

25. The apparatus of claim 23, wherein each reference signal occasion, of the one or more reference signal occasions, spans a respective subset of the contiguous frequency bandwidth.

26. The apparatus of claim 15, wherein the one or more reports further indicate a second capability of the UE to tune each RF chain, of a plurality of RF chains of the UE, to multiple subsets of the contiguous frequency bandwidth.

27. The apparatus of claim 15, wherein the signal carries control information.

28. The apparatus of claim 15, wherein to communicate the signal, the one or more processors are configured to:

transmit the signal; or receive the signal.

29. A method for wireless communications by an apparatus comprising:

sending, to a network entity, one or more reports that indicate a first capability of the apparatus to:

use multiple radio frequency (RF) chains at a time to communicate across contiguous frequency resources, and use each RF chain, of the multiple RF chains, to communicate across a respective non-overlapping subset of the contiguous frequency resources; and communicating, with the network entity, a signal across a contiguous frequency bandwidth, wherein each RE chain, of a plurality of RF chains of the apparatus, is used to communicate a respective portion of the signal across a respective non-overlapping subset of the contiguous frequency bandwidth.

30. A method for wireless communications by an apparatus comprising:

receiving, from a user equipment (UE), one or more reports that indicate a first capability of the UE to;

use multiple radio frequency (RF) chains at a time to communicate across contiguous frequency resources, and use each RE chain of the multiple RF chains, to communicate across a respective non-overlapping subset of the contiguous frequency resources that consist of less than all of the contiguous frequency resources; and communicating, with the UE, based on the first capability, a signal across a contiguous frequency bandwidth.

* * * * *